United States Patent
Calley et al.

(10) Patent No.: US 8,030,819 B2
(45) Date of Patent: Oct. 4, 2011

(54) TRANSVERSE AND/OR COMMUTATED FLUX SYSTEM ROTOR CONCEPTS

(75) Inventors: David G. Calley, Flagstaff, AZ (US); Thomas F. Janecek, Flagstaff, AZ (US)

(73) Assignee: Motor Excellence, LLC, Flagstaff, AZ (US)

( * ) Notice: Subject to any disclaimer, the term of this patent is extended or adjusted under 35 U.S.C. 154(b) by 0 days.

(21) Appl. No.: 13/039,837

(22) Filed: Mar. 3, 2011

(65) Prior Publication Data

US 2011/0148225 A1    Jun. 23, 2011

Related U.S. Application Data

(62) Division of application No. 12/611,733, filed on Nov. 3, 2009, now Pat. No. 7,923,886.

(60) Provisional application No. 61/110,874, filed on Nov. 3, 2008, provisional application No. 61/110,879, filed on Nov. 3, 2008, provisional application No. 61/110,884, filed on Nov. 3, 2008, provisional application No. 61/110,889, filed on Nov. 3, 2008, provisional application No. 61/114,881, filed on Nov. 14, 2008, provisional application No. 61/168,447, filed on Apr. 10, 2009.

(51) Int. Cl.
*H02K 1/06* (2006.01)

(52) U.S. Cl. .................. 310/216.033; 310/267

(58) Field of Classification Search .................. 310/181, 310/190, 216.33–216.41, 265–268, 168
See application file for complete search history.

(56) References Cited

U.S. PATENT DOCUMENTS

| | | |
|---|---|---|
| 1,361,136 A | 12/1920 | Burke |
| 2,078,668 A | 4/1937 | Kilgore |
| 3,403,273 A | 9/1968 | Hiroshi |
| 3,437,854 A | 4/1969 | Oiso |
| 3,558,941 A | 1/1971 | Visconti Brebbia et al. |
| 3,700,942 A | 10/1972 | Alth |
| 3,710,158 A | 1/1973 | Bachle et al. |
| 3,774,059 A | 11/1973 | Cox |
| 3,869,625 A | 3/1975 | Sawyer |
| 3,984,711 A | 10/1976 | Kordik |
| 3,999,107 A | 12/1976 | Reuting |

(Continued)

FOREIGN PATENT DOCUMENTS

DE    1513856    4/1969

(Continued)

OTHER PUBLICATIONS

Notice of Allowance dated Mar. 29, 2005 for U.S. Appl. No. 10/721,765.

(Continued)

*Primary Examiner* — Thanh Lam
(74) *Attorney, Agent, or Firm* — Snell & Wilmer L.L.P.

(57) ABSTRACT

Disclosed are transverse and/or commutated flux machines and components thereof, and methods of making and using the same. Certain rotors for use in transverse and commutated flux machines may be formed to facilitate a "many to many" flux switch configuration between flux concentrating stator portions having opposite polarities. Other rotors may be formed from a first material, and contain flux switches formed from a second material. Yet other rotors may be machined, pressed, stamped, folded, and/or otherwise mechanically formed. Via use of such rotors, transverse and/or commutated flux machines can achieve improved performance, efficiency, and/or be sized or otherwise configured for various applications.

23 Claims, 19 Drawing Sheets

U.S. PATENT DOCUMENTS

| | | |
|---|---|---|
| 4,021,691 A | 5/1977 | Dukshtau et al. |
| 4,114,057 A | 9/1978 | Esters |
| 4,127,802 A | 11/1978 | Johnson |
| 4,206,374 A | 6/1980 | Goddijn |
| 4,237,396 A | 12/1980 | Blenkinsop et al. |
| 4,255,684 A | 3/1981 | Mischler et al. |
| 4,255,696 A | 3/1981 | Field, II |
| 4,286,180 A | 8/1981 | Langley |
| 4,306,164 A | 12/1981 | Itoh et al. |
| 4,363,988 A | 12/1982 | Kliman |
| 4,388,545 A | 6/1983 | Honsinger et al. |
| 4,392,072 A | 7/1983 | Rosenberry |
| 4,459,501 A | 7/1984 | Fawzy |
| 4,501,980 A | 2/1985 | Welburn |
| 4,605,874 A | 8/1986 | Whiteley |
| 4,611,139 A | 9/1986 | Godkin et al. |
| 4,620,752 A | 11/1986 | Fremerey et al. |
| 4,639,626 A | 1/1987 | McGee |
| 4,658,166 A | 4/1987 | Oudet |
| 4,794,286 A | 12/1988 | Taenzer |
| 4,797,602 A | 1/1989 | West |
| 4,835,840 A | 6/1989 | Stokes |
| 4,850,100 A | 7/1989 | Stokes |
| 4,857,786 A | 8/1989 | Nihei et al. |
| 4,899,072 A | 2/1990 | Ohta |
| 4,900,965 A | 2/1990 | Fisher |
| 4,959,577 A | 9/1990 | Radomski |
| 4,990,812 A | 2/1991 | Nam |
| 5,038,066 A | 8/1991 | Pawlak et al. |
| 5,051,641 A | 9/1991 | Weh |
| 5,062,012 A | 10/1991 | Maeda et al. |
| 5,097,167 A | 3/1992 | Kanayama et al. |
| 5,117,142 A | 5/1992 | von Zweygbergk |
| 5,130,595 A | 7/1992 | Arora |
| 5,132,581 A | 7/1992 | Kusase |
| 5,177,054 A | 1/1993 | Lloyd |
| 5,208,503 A | 5/1993 | Hisey |
| 5,212,419 A | 5/1993 | Fisher et al. |
| 5,214,333 A | 5/1993 | Kawamura |
| 5,250,865 A | 10/1993 | Meeks |
| 5,262,746 A | 11/1993 | Masuda |
| 5,278,470 A | 1/1994 | Neag |
| 5,289,072 A | 2/1994 | Lange |
| 5,306,977 A | 4/1994 | Hayashi |
| 5,382,859 A | 1/1995 | Huang et al. |
| 5,386,166 A | 1/1995 | Reimer et al. |
| 5,477,841 A | 12/1995 | Trost et al. |
| 5,530,308 A | 6/1996 | Fanning et al. |
| 5,543,674 A | 8/1996 | Koehler |
| 5,543,677 A | 8/1996 | Fakler |
| 5,633,551 A | 5/1997 | Weh |
| 5,650,680 A | 7/1997 | Chula |
| 5,696,419 A | 12/1997 | Rakestraw et al. |
| 5,712,521 A | 1/1998 | Detela |
| 5,723,921 A | 3/1998 | Sugiura |
| 5,729,065 A | 3/1998 | Fremery et al. |
| 5,731,649 A | 3/1998 | Caamano |
| 5,773,910 A | 6/1998 | Lange |
| 5,777,418 A | 7/1998 | Lange et al. |
| 5,780,953 A | 7/1998 | Umeda et al. |
| 5,814,907 A | 9/1998 | Bandera |
| 5,886,449 A | 3/1999 | Mitcham |
| 5,889,348 A | 3/1999 | Muhlberger et al. |
| 5,894,183 A | 4/1999 | Borchert |
| 5,909,339 A | 6/1999 | Hong |
| 5,925,965 A | 7/1999 | Li et al. |
| 5,942,828 A | 8/1999 | Hill |
| 5,973,436 A | 10/1999 | Mitcham |
| 5,994,802 A | 11/1999 | Shichijyo et al. |
| 6,028,377 A | 2/2000 | Sakamoto |
| 6,043,579 A | 3/2000 | Hill |
| 6,060,810 A | 5/2000 | Lee et al. |
| 6,066,906 A | 5/2000 | Kalsi |
| 6,097,118 A | 8/2000 | Hull |
| 6,097,126 A | 8/2000 | Takura |
| 6,121,712 A | 9/2000 | Sakamoto |
| 6,133,655 A | 10/2000 | Suzuki et al. |
| 6,133,664 A | 10/2000 | Torok et al. |
| 6,133,669 A | 10/2000 | Tupper |
| 6,137,202 A | 10/2000 | Holmes et al. |
| 6,154,013 A | 11/2000 | Caamano |
| 6,163,097 A | 12/2000 | Smith et al. |
| 6,175,177 B1 | 1/2001 | Sabinski et al. |
| 6,177,748 B1 | 1/2001 | Katcher et al. |
| 6,181,035 B1 | 1/2001 | Acquaviva |
| 6,194,799 B1 | 2/2001 | Miekka |
| 6,229,238 B1 | 5/2001 | Graef |
| 6,232,693 B1 | 5/2001 | Gierer et al. |
| 6,236,131 B1 | 5/2001 | Schafer |
| 6,246,561 B1 | 6/2001 | Flynn |
| 6,288,467 B1 | 9/2001 | Lange et al. |
| 6,300,702 B1 | 10/2001 | Jack et al. |
| 6,304,010 B1 | 10/2001 | Sugiura |
| 6,342,746 B1 | 1/2002 | Flynn |
| 6,365,999 B1 | 4/2002 | Muhlberger et al. |
| 6,445,105 B1 | 9/2002 | Kliman et al. |
| 6,448,687 B2 | 9/2002 | Higashino et al. |
| 6,455,970 B1 | 9/2002 | Shafer et al. |
| 6,472,792 B1 | 10/2002 | Jack et al. |
| 6,492,758 B1 | 12/2002 | Gianni et al. |
| 6,545,382 B1 | 4/2003 | Bennett |
| 6,603,060 B1 | 8/2003 | Ohashi et al. |
| 6,603,237 B1 | 8/2003 | Caamano |
| 6,657,329 B2 | 12/2003 | Kastinger et al. |
| 6,664,704 B2 | 12/2003 | Calley |
| 6,700,271 B2 * | 3/2004 | Detela ........................... 310/164 |
| 6,707,208 B2 | 3/2004 | Durham et al. |
| 6,717,297 B2 | 4/2004 | Sadarangani et al. |
| 6,750,582 B1 | 6/2004 | Neet |
| 6,774,512 B2 | 8/2004 | Takagi et al. |
| 6,791,225 B2 | 9/2004 | Campbell et al. |
| 6,794,791 B2 | 9/2004 | Ben Ahmed et al. |
| 6,815,863 B1 | 11/2004 | Jack et al. |
| 6,835,941 B1 | 12/2004 | Tanaka |
| 6,847,135 B2 | 1/2005 | Kastinger et al. |
| 6,849,985 B2 | 2/2005 | Jack et al. |
| 6,853,112 B2 | 2/2005 | Nakamura et al. |
| 6,866,111 B2 | 3/2005 | Dube |
| 6,867,530 B2 | 3/2005 | Gamm et al. |
| 6,879,080 B2 | 4/2005 | Caamano |
| 6,882,066 B2 | 4/2005 | Kastinger |
| 6,882,077 B2 | 4/2005 | Neet |
| 6,885,124 B2 | 4/2005 | Neet |
| 6,885,129 B1 | 4/2005 | Oohashi et al. |
| 6,924,576 B2 * | 8/2005 | Zierer et al. ........... 310/216.058 |
| 6,924,579 B2 | 8/2005 | Calley |
| 6,940,197 B2 | 9/2005 | Fujita et al. |
| 6,949,855 B2 | 9/2005 | Dubois et al. |
| 6,960,862 B2 | 11/2005 | Hill |
| 6,979,925 B2 | 12/2005 | Schwamm |
| 6,989,622 B1 | 1/2006 | Chen et al. |
| 7,015,603 B2 | 3/2006 | Barrho et al. |
| 7,026,737 B2 | 4/2006 | Angerer et al. |
| 7,030,529 B2 * | 4/2006 | Dommsch et al. ....... 310/156.22 |
| 7,030,534 B2 | 4/2006 | Caamano |
| 7,064,469 B2 | 6/2006 | Jack et al. |
| 7,067,954 B2 | 6/2006 | Kuribayashi et al. |
| 7,071,593 B2 | 7/2006 | Matsushita et al. |
| 7,126,313 B2 | 10/2006 | Dooley |
| 7,129,602 B2 | 10/2006 | Lange et al. |
| 7,135,802 B2 | 11/2006 | Seki et al. |
| 7,208,856 B2 | 4/2007 | Imai et al. |
| 7,211,922 B2 | 5/2007 | Isoda et al. |
| 7,230,361 B2 | 6/2007 | Hirzel |
| 7,242,118 B2 | 7/2007 | Sakamoto |
| 7,245,055 B2 | 7/2007 | Jack |
| 7,250,704 B1 | 7/2007 | Sortore et al. |
| 7,259,483 B2 | 8/2007 | Komiya et al. |
| 7,265,472 B2 | 9/2007 | Mitcham |
| 7,268,456 B2 | 9/2007 | Harada et al. |
| 7,279,820 B2 | 10/2007 | Grundl et al. |
| 7,358,639 B2 | 4/2008 | Caamano |
| 7,385,329 B2 | 6/2008 | Hill |
| 7,385,330 B2 | 6/2008 | Trzynadlowski et al. |
| 7,420,312 B2 | 9/2008 | Kitamura et al. |
| 7,466,057 B2 | 12/2008 | Imai et al. |
| 7,474,030 B2 | 1/2009 | Mitcham |

| | | |
|---|---|---|
| 7,579,742 B1 * | 8/2009 | Rittenhouse ............... 310/257 |
| 7,592,735 B2 | 9/2009 | Hamada |
| 7,602,095 B2 | 10/2009 | Kusase |
| 7,638,919 B2 | 12/2009 | Pulnikov et al. |
| 7,679,253 B2 | 3/2010 | Neet |
| 7,800,275 B2 | 9/2010 | Calley |
| 7,851,965 B2 | 12/2010 | Calley |
| 7,863,797 B2 | 1/2011 | Calley |
| 7,868,508 B2 | 1/2011 | Calley et al. |
| 7,868,511 B2 | 1/2011 | Calley |
| 7,876,019 B2 | 1/2011 | Calley |
| 7,923,886 B2 | 4/2011 | Calley et al. |
| 2001/0001528 A1 | 5/2001 | Ragaly |
| 2001/0030479 A1 | 10/2001 | Mohler |
| 2001/0030486 A1 | 10/2001 | Pijanowski |
| 2002/0070627 A1 | 6/2002 | Ward et al. |
| 2002/0113520 A1 | 8/2002 | Kastinger et al. |
| 2002/0125775 A1 * | 9/2002 | Detela ............... 310/54 |
| 2002/0135242 A1 | 9/2002 | Kawai |
| 2003/0122439 A1 | 7/2003 | Horst |
| 2003/0122440 A1 | 7/2003 | Horst |
| 2004/0061396 A1 | 4/2004 | Narita et al. |
| 2004/0140730 A1 | 7/2004 | Barrho et al. |
| 2004/0145269 A1 | 7/2004 | Barrho et al. |
| 2004/0150288 A1 | 8/2004 | Calley |
| 2004/0189138 A1 | 9/2004 | Jack |
| 2004/0207281 A1 * | 10/2004 | Detela ............... 310/162 |
| 2004/0212267 A1 | 10/2004 | Jack et al. |
| 2004/0232799 A1 | 11/2004 | Chen et al. |
| 2004/0239207 A1 | 12/2004 | Kloepzig et al. |
| 2004/0251759 A1 | 12/2004 | Hirzel |
| 2004/0251761 A1 | 12/2004 | Hirzel |
| 2004/0262105 A1 | 12/2004 | Li et al. |
| 2005/0006978 A1 | 1/2005 | Bradfield |
| 2005/0012427 A1 | 1/2005 | Seki et al. |
| 2005/0062348 A1 | 3/2005 | Ohnishi et al. |
| 2005/0062352 A1 * | 3/2005 | Kastinger ............... 310/156.02 |
| 2005/0121983 A1 | 6/2005 | Ehrhart |
| 2005/0156479 A1 | 7/2005 | Fujita et al. |
| 2005/0212381 A1 * | 9/2005 | Gilmour et al. ............... 310/266 |
| 2005/0242679 A1 | 11/2005 | Walter et al. |
| 2006/0012259 A1 | 1/2006 | Kerlin |
| 2006/0012263 A1 | 1/2006 | Smith et al. |
| 2006/0082237 A1 | 4/2006 | Kerlin |
| 2006/0091755 A1 | 5/2006 | Carlisle et al. |
| 2006/0131974 A1 | 6/2006 | Sadarangani et al. |
| 2006/0131986 A1 | 6/2006 | Hsu et al. |
| 2006/0192453 A1 | 8/2006 | Gieras et al. |
| 2006/0220477 A1 | 10/2006 | Okumoto et al. |
| 2006/0261688 A1 | 11/2006 | Akita et al. |
| 2007/0013253 A1 | 1/2007 | Dubois et al. |
| 2007/0046137 A1 | 3/2007 | Ooiwa |
| 2007/0046139 A1 | 3/2007 | Ishizuka |
| 2007/0075605 A1 | 4/2007 | Enomoto et al. |
| 2007/0138900 A1 | 6/2007 | Imai et al. |
| 2007/0152528 A1 | 7/2007 | Kang et al. |
| 2007/0176505 A1 | 8/2007 | Trzynadlowski et al. |
| 2007/0267929 A1 * | 11/2007 | Pulnikov et al. ......... 310/156.02 |
| 2008/0007126 A1 | 1/2008 | Popov et al. |
| 2008/0169776 A1 | 7/2008 | Acker |
| 2008/0211326 A1 * | 9/2008 | Kang et al. ............... 310/44 |
| 2008/0211336 A1 | 9/2008 | Sadarangani |
| 2008/0246362 A1 | 10/2008 | Hirzel |
| 2008/0265707 A1 | 10/2008 | Bradfield |
| 2008/0309188 A1 | 12/2008 | Calley |
| 2008/0315700 A1 | 12/2008 | Ishikawa et al. |
| 2009/0026866 A1 | 1/2009 | Groening et al. |
| 2009/0085415 A1 | 4/2009 | Ionel et al. |
| 2009/0160288 A1 | 6/2009 | Calley |
| 2009/0206693 A1 | 8/2009 | Calley et al. |
| 2009/0206696 A1 | 8/2009 | Calley |
| 2009/0208771 A1 | 8/2009 | Janecek |
| 2009/0243406 A1 | 10/2009 | Jack et al. |
| 2009/0255924 A1 | 10/2009 | Lovens |
| 2009/0284253 A1 | 11/2009 | Finkler et al. |
| 2009/0295237 A1 | 12/2009 | Gloor |
| 2009/0322165 A1 | 12/2009 | Rittenhouse |
| 2010/0013341 A1 | 1/2010 | Vollmer |
| 2010/0013343 A1 | 1/2010 | Bi |
| 2010/0052467 A1 | 3/2010 | Gieras |
| 2011/0050010 A1 | 3/2011 | Calley et al. |
| 2011/0062723 A1 | 3/2011 | Calley et al. |

FOREIGN PATENT DOCUMENTS

| | | |
|---|---|---|
| DE | 3626149 | 8/1986 |
| DE | 3602687 | 8/1987 |
| DE | 8711725 | 8/1987 |
| DE | 3927453 | 2/1991 |
| DE | 19634949 | 5/1998 |
| DE | 102006026719 | 6/2006 |
| EP | 0544200 | 11/1992 |
| EP | 0707374 | 4/1996 |
| EP | 0718959 | 6/1996 |
| EP | 0998010 | 3/2000 |
| EP | 1063754 | 12/2000 |
| EP | 1117168 | 7/2001 |
| EP | 1227566 | 7/2002 |
| GB | 518298 | 9/1938 |
| GB | 2052176 | 1/1986 |
| JP | 60241758 | 11/1985 |
| JP | 61042248 | 2/1986 |
| JP | 2001025197 | 1/2001 |
| KR | 10-2008-0061415 | 3/2008 |
| WO | WO 93/14551 | 7/1993 |
| WO | WO 99/34497 | 7/1999 |
| WO | WO 02/075895 | 9/2002 |
| WO | WO 2005/091475 | 9/2005 |
| WO | WO 2007024184 | 3/2007 |
| WO | WO2009/027938 | 3/2009 |
| WO | WO 2009116935 | 9/2009 |
| WO | WO 2009116936 | 9/2009 |
| WO | WO 2009116937 | 9/2009 |
| WO | WO2009/133295 | 11/2009 |
| WO | WO2009/156297 | 12/2009 |
| WO | WO2010/036221 | 4/2010 |
| WO | WO2010/048928 | 5/2010 |
| WO | WO2010/133295 | 11/2010 |

OTHER PUBLICATIONS

Notice of Allowance dated Feb. 13, 2008 for U.S. Appl. No. 11/679,806.
Notice of Allowance dated May 30, 2003 for U.S. Appl. No. 10/273,238.
Notice of Allowance dated Nov. 3, 2009 for U.S. Appl. No. 12/149,931.
Notice of Allowance dated Dec. 30, 2009 for U.S. Appl. No. 12/149,931.
Office Action dated Sep. 28, 2007 for U.S. Appl. No. 11/679,806.
Office Action dated Nov. 30, 2009 for U.S. Appl. No. 12/149,935.
Office Action dated Sep. 13, 2004 for U.S. Appl. No. 10/721,765.
ISR and WO dated Aug. 15, 2008 for International Application No. PCT/US2008/063301.
IPRP dated Nov. 10, 2009 for International Application No. PCT/US2008/063301.
ISR and WO dated Aug. 20, 2008 for International Application No. PCT/US2008/063236.
IPRP dated Nov. 17, 2009 for International Application No. PCT/US2008/063236.
ISR and WO dated Oct. 24, 2008 for International Application No. PCT/US2008/063336.
IPRP dated Nov. 17, 2009 for International Application No. PCT/US2008/063336.
ISR and WO dated Aug. 15, 2008 for International Application No. PCT/US2008/063287.
IPRP dated Nov. 10, 2009 for International Application No. PCT/US2008/063287.
IPRP dated Nov. 10, 2009 for International Application No. PCT/US2008/063268.
Technical Project Presentation—Development of a High-Performance Generator for Wind Turbines—by Andrzej M. Trzynadlowski, PhD, University of Nevada, Reno, FIEEE, Aug. 2007.
Technical Project Presentation—Development of a High-Performance Generator for Wind Turbines—Final Report—University of Nevada, Reno—Feb. 2004.

"Magnetic Field Calculation of Claw Pole Permanent Magnet Machines Using Magnetic Network Method": J. Elect. Electron. Eng., Australia, vol. 22, No. 1, pp. 69-75, 2002.

"Applications of Power Electronics in Automotive Power Generation",—by David J. Perreault et al., Laboratory for Electromagnetic and Electronic Systems, Massachusetts Institute of Technology, Jun. 21-22, 2006—Paris.

"Thermal Modeling of Lundell Alternators", IEEE Transactions on Energy Conversion, vol. 20, No. 1, Mar. 2005.

"Iron Loss Calculation in a Claw-Pole Structure", by A. Reinap et al., Lund University, Jun. 2004.

"Permanent Magnet Assisted Synchronous Reluctance Motor Design and Performance Improvement",—A Dissertation by Peyman Niazi, Texas A&M University, Dec. 2005.

"New Design of Hybrid-Type Self-Bearing Motor for Small, High-Speed Spindle",—by Hideki Kanebako et al., IEEE/ASME Transactions on Mechatronics, vol. 8, No. 1, Mar. 2003, retrieved Jan. 8, 2010.

"Evaluation of Rotor Conducting Screens on the Single-Phase Switched Reluctance Machine",—by M.M. Mahmoud et al., School of Engineering and Physical Sciences, Heriot-Watt University, Riccarton, Edinburgh, Scotland, United Kingdom, May 3, 2005.

"Analytical Interpretation and Quantification of Rotational Losses in Stator Cores of Induction Motors",—IEEE Transactions on Magnetics, vol. 43, No. 10, Oct. 2007, retrieved Jan. 8, 2010.

Hasubek, B.E. et al.; "Design Limitations of Reduced Magnet Material Passive Rotor Transverse Flux Motors Investigated Using 3D Finite Element Analysis"; 2000; pp. 365-369, retrieved Oct. 24, 2008.

Dubois, Maxine R. et al.; "Clawpole Transverse-Flux Machine with Hybrid Stator"; pp. 1-6, Jul. 15, 2006.

Henneberger, G. et al.; "On the Parameters Computation of a Single Sided Transverse Flux Motor"; Workshop on Electrical Machines' Parameters, Technical University of Cluj-Napoca, May 26, 2001; pp. 35-40.

Woolmer, MD, T.J., et al., "Analysis of the Yokeless and Segmented Armature Machine", Electric Machines & Drives Conference, 2007. IEMDC apos; 07. IEEE International, May 3-5, 2007, pp. 704-708, vol. 1, Oxford University, Engineering Department, Parks Road, Oxford, UK.

Husband, S.M. et al.; "The Rolls-Royce Transverse Flux Motor Development"; Electric Machines and Drives Conference, vol. 3, pp. 1435-1440, IEEE, 2003.

Theory of SR Motor Operation (Power Point Presentation), copyright 2002 by George Holling and Rocky Mountain Technologies Inc.

Development of a PM Transverse Flux Motor With Soft Magnetic Composite Core—IEEE Transactions on Energy Conversion, vol. 21, No. 2, Jun. 2006.

Fundamental Modeling for Optimal Design of Transverse Flux Motors—Genevieve Patterson et al., University of Tokyo, 2008.

www.higenmotor.com/eng/aboutus/about06 read.asp?id=notice &no=87 dated Jan. 15, 2010.

LYNG ELTORQUE QT 800—2.0 User Manual, version 1.0—dated Jul. 3, 2007.

Motors: Emerging Concepts (Apr. 2007) by George Holling.

www.iem.rwth-aachen.de/index.pl/new materials and machines?makePrintable=1; retrieved Jan. 15, 2010.

Raser Technologies Company Brochure, 2005.

Response to Office Action filed Jan. 15, 2010 for Japanese Patent Application No. JP-2003-548374.

Office Action dated Mar. 2, 2010 for U.S. Appl. No. 12/149,931.

Restriction Requirement dated Apr. 5, 2010 for U.S. Appl. No. 12/149,934.

Restriction Requirement dated Apr. 22, 2010 for U.S. Appl. No. 12/149,936.

Office Action dated Apr. 28, 2010 for U.S. Appl. No. 12/149,935.

Notice of Allowance dated May 4, 2010 for U.S. Appl. No. 12/149,931.

ISR and WO dated Jun. 10, 2010 for International Application No. PCT/US2009/063145.

ISR and WO dated Jun. 10, 2010 for International Application No. PCT/US2009/063142.

ISR and WO dated Jun. 18, 2010 for International Application No. PCT/US2009/063147.

Office Action dated May 19, 2010 for U.S. Appl. No. 12/149,934.

Office Action dated Jul. 27, 2010 for U.S. Appl. No. 12/149,936.

Office Action dated Aug. 9, 2010 for U.S. Appl. No. 12/611,733.

Notice of Allowance dated Aug. 12, 2010 for U.S. Appl. No. 12/611,728.

Notice of Allowance dated Aug. 19, 2010 for U.S. Appl. No. 12/611,737.

Notice of Allowance dated Sep. 8, 2010 for U.S. Appl. No. 12/149,934.

Notice of Allowance dated Oct. 6, 2010 for U.S. Appl. No. 12/149,935.

Restriction Requirement dated Dec. 20, 2010 for U.S. Appl. No. 12/149,933.

Final Office Action dated Jan. 4, 2011 for U.S. Appl. No. 12/149,936.

Restriction Requirement dated Feb. 24, 2011 for U.S. Appl. No. 12/942,495.

Notice of Allowance dated Feb. 28, 2011 for U.S. Appl. No. 12/149,936.

"Two Dimensional Finite Element Analysis of Passive Rotor Transverse Flux Motors with Slanted Rotor Design" by B. E. Hasubek, et al., May 1999.

Notice of Allowance dated Nov. 2, 2010 for U.S. Appl. No. 12/847,991.

Notice of Allowance dated Dec. 9, 2010 for U.S. Appl. No. 12/611,733.

Notice of Allowance dated Mar. 31, 2011 for U.S. Appl. No. 12/948,925.

IPRP dated Nov. 10, 2009 for International Application No. PCT/US2008/063268.

Notice of Allowance dated Apr. 19, 2011 for U.S. Appl. No. 12/942,495.

ISR & WO dated Apr. 12, 2011 for International Application No. PCT/US2010/033445.

ISR & WO dated Apr. 12, 2011 for International Application No. PCT/US2010/033444.

ISR & WO dated Apr. 12, 2011 for International Application No. PCT/US2010/033446.

International Preliminary Report on Patentability dated May 3, 2011, PCT/US2009/063142.

International Preliminary Report on Patentability dated May 3, 2011, PCT/US2009/063145.

International Preliminary Report on Patentability dated May 3, 2011, PCT/US2009/063147.

Notice of Allowance dated May 23, 2011, U.S. Appl. No. 13/039,837.

Notice of Allowance dated Jul. 8, 2011, U.S. Appl. No. 12/772,958.

Restriction Requirement dated Jul. 7, 2011, U.S. Appl. No. 12/772,959.

Restriction Requirement dated Jul. 7, 2011, U.S. Appl. No. 12/772,962.

* cited by examiner

TRANSVERSE AND/OR COMMUTATED FLUX SYSTEM ROTOR CONCEPTS

CROSS REFERENCE TO RELATED APPLICATIONS

This application is a divisional of U.S. Ser. No. 12/611,733 filed on Nov. 3, 2009, now U.S. Pat. No. 7,923,886 and entitled "TRANSVERSE AND/OR COMMUTATED FLUX SYSTEM ROTOR CONCEPTS".

U.S. Ser. No. 12/611,733 is a non-provisional of U.S. Provisional No. 61/110,874 filed on Nov. 3, 2008 and entitled "ELECTRICAL OUTPUT GENERATING AND DRIVEN ELECTRICAL DEVICES USING COMMUTATED FLUX AND METHODS OF MAKING AND USE THEREOF INCLUDING DEVICES WITH TRUNCATED STATOR PORTIONS."

U.S. Ser. No. 12/611,733 is also a non-provisional of U.S. Provisional No. 61/110,879 filed on Nov. 3, 2008 and entitled "ELECTRICAL OUTPUT GENERATING AND DRIVEN ELECTRICAL DEVICES USING COMMUTATED FLUX AND METHODS OF MAKING AND USE THEREOF."

U.S. Ser. No. 12/611,733 is also a non-provisional of U.S. Provisional No. 61/110,884 filed on Nov. 3, 2008 and entitled "METHODS OF MACHINING AND USING AMORPHOUS METALS OR OTHER MAGNETICALLY CONDUCTIVE MATERIALS INCLUDING TAPE WOUND TORROID MATERIAL FOR VARIOUS ELECTROMAGNETIC APPLICATIONS."

U.S. Ser. No. 12/611,733 is also a non-provisional of U.S. Provisional No. 61/110,889 filed on Nov. 3, 2008 and entitled "MULTI-PHASE ELECTRICAL OUTPUT GENERATING AND DRIVEN ELECTRICAL DEVICES WITH TAPE WOUND CORE LAMINATE ROTOR OR STATOR ELEMENTS, AND METHODS OF MAKING AND USE THEREOF."

U.S. Ser. No. 12/611,733 is also a non-provisional of U.S. Provisional No. 61/114,881 filed on Nov. 14, 2008 and entitled "ELECTRICAL OUTPUT GENERATING AND DRIVEN ELECTRICAL DEVICES USING COMMUTATED FLUX AND METHODS OF MAKING AND USE THEREOF."

U.S. Ser. No. 12/611,733 is also a non-provisional of U.S. Provisional No. 61/168,447 filed on Apr. 10, 2009 and entitled "MULTI-PHASE ELECTRICAL OUTPUT GENERATING AND DRIVEN ELECTRICAL DEVICES, AND METHODS OF MAKING AND USING THE SAME." The entire contents of all of the foregoing applications are hereby incorporated by reference.

TECHNICAL FIELD

The present disclosure relates to electrical systems, and in particular to transverse flux machines and commutated flux machines.

BACKGROUND

Motors and alternators are typically designed for high efficiency, high power density, and low cost. High power density in a motor or alternator may be achieved by operating at high rotational speed and therefore high electrical frequency. However, many applications require lower rotational speeds. A common solution to this is to use a gear reduction. Gear reduction reduces efficiency, adds complexity, adds weight, and adds space requirements. Additionally, gear reduction increases system costs and increases mechanical failure rates.

Additionally, if a high rotational speed is not desired, and gear reduction is undesirable, then a motor or alternator typically must have a large number of poles to provide a higher electrical frequency at a lower rotational speed. However, there is often a practical limit to the number of poles a particular motor or alternator can have, for example due to space limitations. Once the practical limit is reached, in order to achieve a desired power level the motor or alternator must be relatively large, and thus have a corresponding lower power density.

Moreover, existing multipole windings for alternators and electric motors typically require winding geometry and often complex winding machines in order to meet size and/or power needs. As the number of poles increases, the winding problem is typically made worse. Additionally, as pole count increases, coil losses also increase (for example, due to resistive effects in the copper wire or other material comprising the coil). However, greater numbers of poles have certain advantages, for example allowing a higher voltage constant per turn, providing higher torque density, and producing voltage at a higher frequency.

Most commonly, electric motors are of a radial flux type. To a far lesser extent, some electric motors are implemented as transverse flux machines and/or commutated flux machines. It is desirable to develop improved electric motor and/or alternator performance and/or configurability. In particular, improved transverse flux machines and/or commutated flux machines are desirable.

SUMMARY

This disclosure relates to transverse and/or commutated flux machines. In an exemplary embodiment, an electrical machine comprises a rotor comprising a molded rotor frame and a flux switch. The molded rotor frame comprises a first material. The flux switch comprises a second material having a saturation induction in excess of 1.0 Tesla. The flux switch is coupled to the molded rotor frame. A first surface of the flux switch aligns with a first pole of the electrical machine. A second surface of the flux switch aligns with a second pole of the electrical machine in order to conduct magnetic flux. The electrical machine is at least one of a transverse flux machine or a commutated flux machine.

In another exemplary embodiment, a method of forming a rotor for an electrical machine comprises forming a rotor frame having a plurality of trenches therein, placing a continuous section of material within at least two of the plurality of trenches such that the continuous section of material has at least one bend, and removing at least a portion of the material to form a flux switch. The electrical machine is at least one of a transverse flux machine or a commutated flux machine.

In another exemplary embodiment, a rotor for an electrical machine comprises a rotor frame having a plurality of trenches therein, and a first flux switch and a second flux switch. The first flux switch and the second flux switch are disposed in adjacent trenches of the rotor frame. The first flux switch and the second flux switch were formed from a continuous section of material having at least one bend therein. The electrical machine is at least one of a transverse flux machine or a commutated flux machine.

The contents of this summary section are provided only as a simplified introduction to the disclosure, and are not intended to be used to limit the scope of the appended claims.

BRIEF DESCRIPTION OF THE DRAWINGS

With reference to the following description, appended claims, and accompanying drawings:

DETAILED DESCRIPTION

Figure 1B:
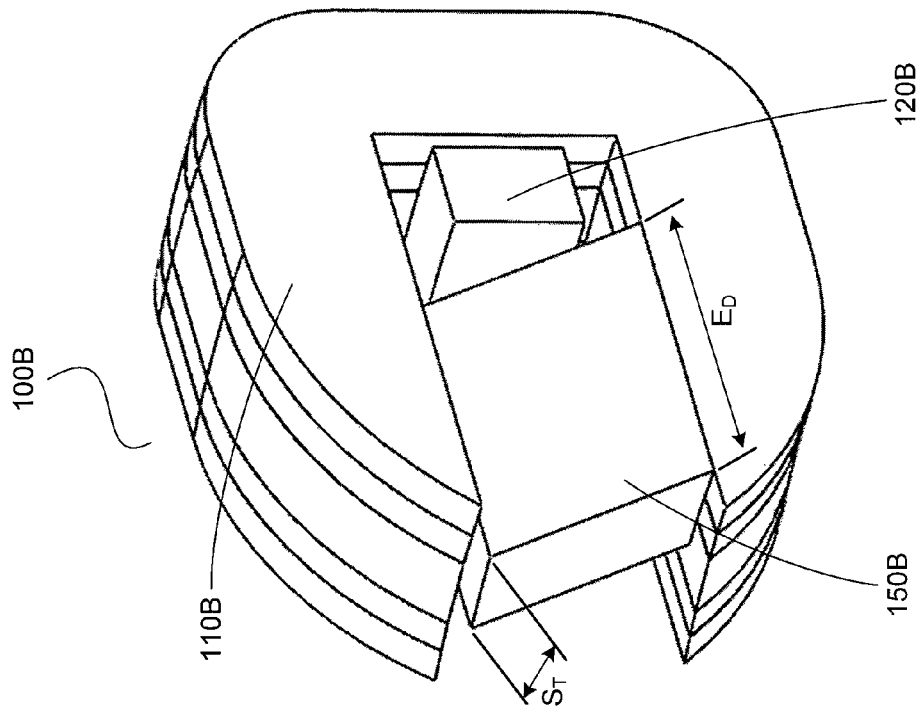
FIG. 1B illustrates an exemplary commutated flux machine in accordance with an exemplary embodiment.

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments without departing from the scope of the appended claims.

For the sake of brevity, conventional techniques for electrical system construction, management, operation, measurement, optimization, and/or control, as well as conventional techniques for magnetic flux utilization, concentration, control, and/or management, may not be described in detail herein. Furthermore, the connecting lines shown in various figures contained herein are intended to represent exemplary functional relationships and/or physical couplings between various elements. It should be noted that many alternative or additional functional relationships or physical connections may be present in a practical electrical system, for example an AC synchronous electric motor.

Prior electric motors, for example conventional DC brushless motors, suffer from various deficiencies. For example, many electric motors are inefficient at various rotational speeds and/or loads, for example low rotational speeds. Thus, the motor is typically operated within a narrow RPM range and/or load range of suitable efficiency. In these configurations, gears or other mechanical approaches may be required in order to obtain useful work from the motor.

Moreover, many electric motors have a low pole count. Because power is a function of torque and RPM, such motors must often be operated at a high physical RPM in order to achieve a desired power density and/or electrical frequency. Moreover, a higher power density (for example, a higher kilowatt output per kilogram of active electrical and magnetic motor mass) optionally is achieved by operating the motor at high rotational speed and therefore high electrical frequency. However, high electrical frequency can result in high core losses and hence lower efficiency. Moreover, high electrical frequency can result in increased cost, increased mechanical complexity, and/or decreased reliability. Additionally, high electrical frequency and associated losses create heat that may require active cooling, and can limit the operational range of the motor. Heat can also degrade the life and reliability of a high frequency machine.

Still other electric motors contain large volumes of copper wire or other coil material. Due to the length of the coil windings, resistive effects in the coil lead to coil losses. For example, such losses convert a portion of electrical energy into heat, reducing efficiency and potentially leading to thermal damage to and/or functional destruction of the motor.

Moreover, many prior electric motors offered low torque densities. As used herein, "torque density" refers to Newton-meters produced per kilogram of active electrical and magnetic materials. For example, many prior electric motors are configured with a torque density from about 0.5 Newton-meters per kilogram to about 3 Newton-meters per kilogram. Thus, a certain electric motor with a torque density of 1 Newton-meter per kilogram providing, for example, 10 total Newton-meters of torque may be quite heavy, for example in excess of 10 kilograms of active electrical and magnetic materials. Similarly, another electric motor with a torque density of 2 Newton-meters per kilogram providing, for example, 100 total Newton-meters of torque may also be quite heavy, for example in excess of 50 kilograms of active electrical and magnetic materials. As can be appreciated, the total weight of these electric motors, for example including weight of frame components, housings, and the like, may be significantly higher. Moreover, such prior electric motors are often quite bulky as a result of the large motor mass: Often, a motor of sufficient torque and/or power for a particular application is difficult or even impossible to fit in the available area.

Even prior transverse flux machines have been unable to overcome these difficulties. For example, prior transverse flux machines have suffered from significant flux leakage. Still others have offered torque densities of only a few Newton-meters per kilogram of active electrical and magnetic materials. Moreover, various prior transverse flux machines have been efficiently operable only within a comparatively narrow RPM and/or load range. Additionally, using prior transverse flux machines to generate substantial output power often required spinning relatively massive and complicated components (i.e., those involving permanent magnets and/or relatively exotic, dense and/or expensive flux concentrating or conducting materials) at high rates of speed. Such high-speed operation requires additional expensive and/or complicated components for support and/or system reliability. Moreover, many prior transverse flux machines are comparatively expensive and/or difficult to manufacture, limiting their viability.

In contrast, various of these problems can be solved by utilizing transverse flux machines configured in accordance with principles of the present disclosure. As used herein, a "transverse flux machine" and/or "commutated flux machine" may be any electrical machine wherein magnetic flux paths have sections where the flux is generally transverse to a rotational plane of the machine. In an exemplary embodiment, when a magnet and/or flux concentrating components are on a rotor and/or are moved as the machine operates, the electrical machine may be a pure "transverse" flux machine. In another exemplary embodiment, when a magnet and/or flux concentrating components are on a stator and/or are held stationary as the machine operates, the electrical machine may be a pure "commutated" flux machine. As is readily apparent, in certain configurations a "transverse flux machine" may be considered to be a "commutated flux machine" by fixing the rotor and moving the stator, and vice versa. Moreover, a coil may be fixed to a stator; alternatively, a coil may be fixed to a rotor.

Moreover, there is a spectrum of functionality and device designs bridging the gap between a commutated flux machine and a transverse flux machine. Certain designs may rightly fall between these two categories, or be considered to belong to both simultaneously. Therefore, as will be apparent to one skilled in the art, in this disclosure a reference to a "transverse flux machine" may be equally applicable to a "commutated flux machine" and vice versa.

Figure 2B:
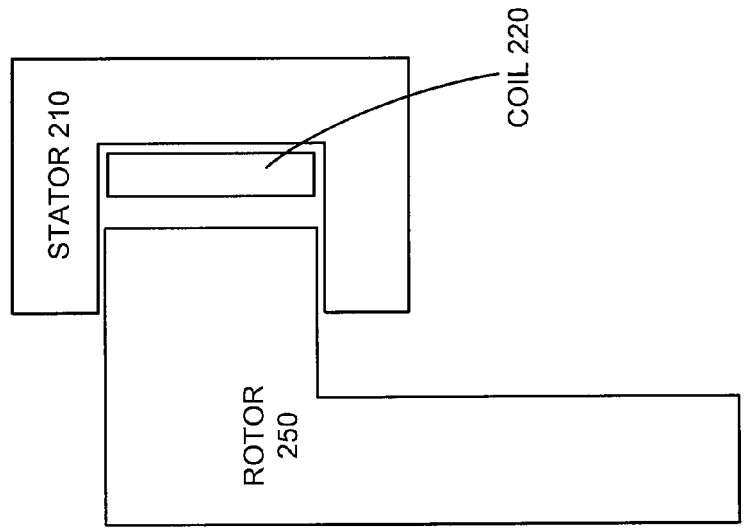
FIG. 2B illustrates an exemplary radial gap configuration in accordance with an exemplary embodiment.
Figure 2A:
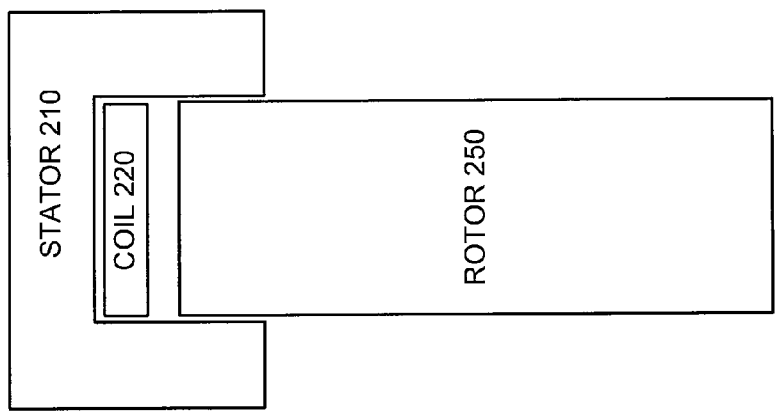
FIG. 2A illustrates an exemplary axial gap configuration in accordance with an exemplary embodiment.

Moreover, transverse flux machines and/or commutated flux machines may be configured in multiple ways. For example, with reference to FIG. 2A, a commutated flux machine may be configured with a stator 210 generally aligned with the rotational plane of a rotor 250. Such a configuration is referred to herein as "axial gap." In another configuration, with reference to FIG. 2B, a commutated flux machine may be configured with stator 210 rotated about 90 degrees with respect to the rotational plane of rotor 250. Such a configuration is referred to herein as "radial gap."

Figure 3B:
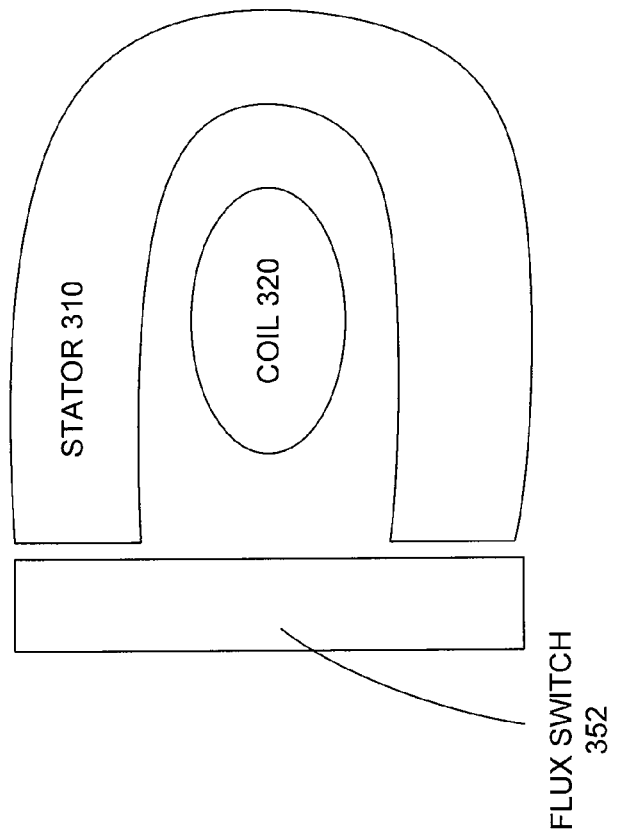
FIG. 3B illustrates an exemplary face engaged configuration in accordance with an exemplary embodiment.
Figure 3A:
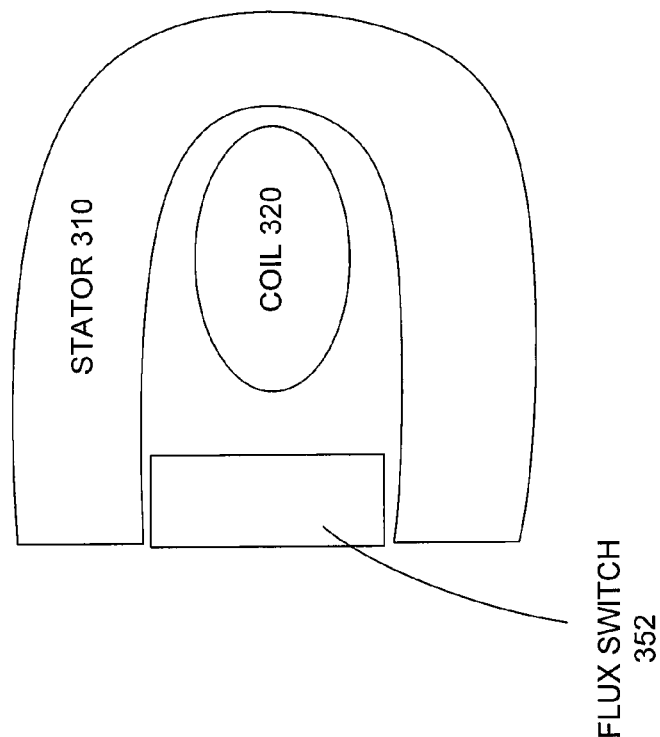
FIG. 3A illustrates an exemplary cavity engaged configuration in accordance with an exemplary embodiment.

With reference now to FIG. 3A, a flux switch 352 in a commutated flux machine may engage a stator 310 by extending at least partially into a cavity defined by stator 310. Such a configuration is referred to herein as "cavity engaged." Turning to FIG. 3B, flux switch 352 in a commutated flux machine may engage stator 310 by closely approaching two terminal faces of stator 310. Such a configuration is referred to herein as "face engaged." Similar engagement approaches may be followed in transverse flux machines and are referred to in a similar manner.

Figure 1A:
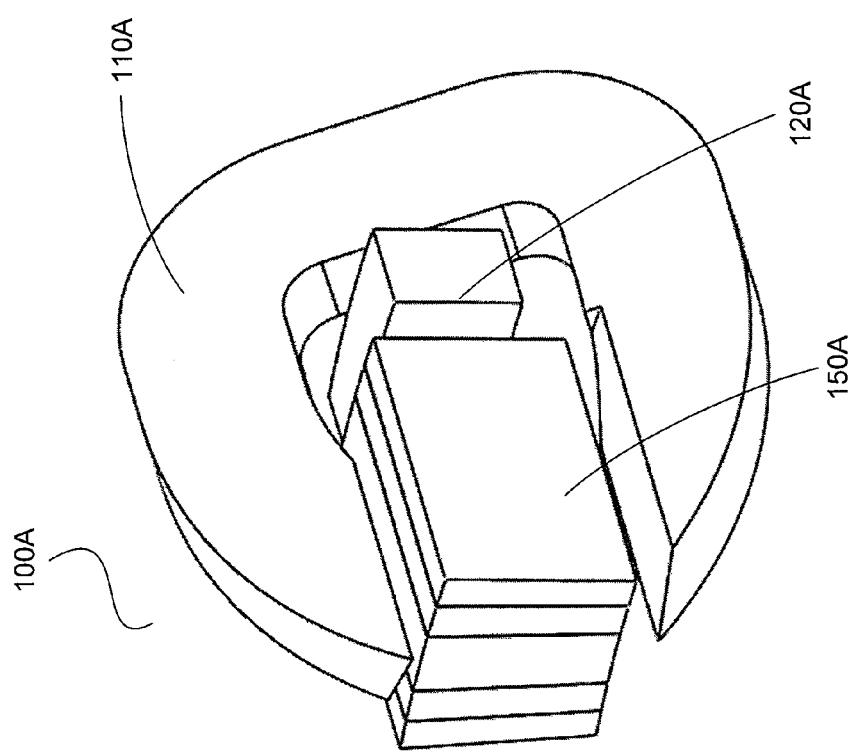
FIG. 1A illustrates an exemplary transverse flux machine in accordance with an exemplary embodiment.

In general, a transverse flux machine and/or commutated flux machine comprises a rotor, a stator, and a coil. A flux switch may be located on the stator or the rotor. As used herein, a "flux switch" may be any component, mechanism, or device configured to open and/or close a magnetic circuit. (i.e., a portion where the permeability is significantly higher than air). A magnet may be located on the stator or the rotor. A coil is at least partially enclosed by the stator or the rotor. Optionally, flux concentrating portions may be included on the stator and/or the rotor. With momentary reference now to FIG. 1A, an exemplary transverse flux machine 100A may comprise a rotor 150A, a stator 110A, and a coil 120A. In this exemplary embodiment, a magnet may be located on rotor 150A. With momentary reference now to FIG. 1B, an exemplary commutated flux machine 100B may comprise a rotor 150B, a stator 110B, and a coil 120B. In this exemplary embodiment, a magnet may be located on stator 110B.

Moreover, a transverse flux machine and/or commutated flux machine may be configured with any suitable components, structures, and/or elements in order to provide desired electrical, magnetic, and/or physical properties. For example, a commutated flux machine having a continuous, thermally stable torque density in excess of 50 Newton-meters per kilogram may be achieved by utilizing a polyphase configuration. As used herein, "continuous, thermally stable torque density" refers to a torque density maintainable by a motor, without active cooling, during continuous operation over a period of one hour or more. Moreover, in general, a continuous, thermally stable torque density may be considered to be a torque density maintainable by a motor for an extended duration of continuous operation, for example one hour or more, without thermal performance degradation and/or damage.

Moreover, a transverse flux machine and/or commutated flux machine may be configured to achieve low core losses. By utilizing materials having high magnetic permeability, low coercivity, low hysteresis losses, low eddy current losses, and/or high electrical resistance, core losses may be reduced. For example, silicon steel, powdered metals, plated powdered metals, soft magnetic composites, amorphous metals, nanocrystalline composites, and/or the like may be utilized in rotors, stators, switches, and/or other flux conducting components of a transverse flux machine and/or commutated flux machine. Eddy currents, flux leakage, and other undesirable properties may thus be reduced.

A transverse flux machine and/or commutated flux machine may also be configured to achieve low core losses by varying the level of saturation in a flux conductor, such as in an alternating manner. For example, a flux conducting element in a stator may be configured such that a first portion of the flux conducting element saturates at a first time during operation of the stator. Similarly, a second portion of the same flux conducting element saturates at a second time during operation of the stator. In this manner, portions of the flux conducting element have a level of magnetic flux density significantly below the saturation induction from time to time, reducing core loss. For example, significant portions of the flux conducting element may have a level of flux density less than 25% of the saturation induction within the 50% of the time of its magnetic cycle. Moreover, any suitable flux density variations may be utilized.

Furthermore, a transverse flux machine and/or commutated flux machine may be configured to achieve low coil losses. For example, in contrast to a conventional electric motor utilizing a mass of copper C in one or more coils in order to achieve a desired output power P, a particular transverse flux machine and/or commutated flux machine may utilize only a small amount of copper C (for example, one-tenth as much copper C) while achieving the same output power P. Additionally, a transverse flux machine and/or commutated flux machine may be configured to utilize coil material in an improved manner (for example, by reducing and/or eliminating "end turns" in the coil). In this manner, resistive losses, eddy current losses, thermal losses, and/or other coil losses associated with a given coil mass C may be reduced. Moreover, within a transverse flux machine and/or commutated flux machine, a coil may be configured, shaped, oriented, aligned, manufactured, and/or otherwise configured to further reduce losses for a given coil mass C.

Additionally, in accordance with principles of the present disclosure, a transverse flux machine and/or commutated flux machine may be configured to achieve a higher voltage constant. In this manner, the number of turns in the machine may be reduced, in connection with a higher frequency. A corresponding reduction in coil mass and/or the number of turns in the coil may thus be achieved.

Yet further, in accordance with principles of the present disclosure, a transverse flux machine and/or commutated flux machine may be configured to achieve a high flux switching frequency, for example a flux switching frequency in excess of 1000 Hz. Because flux is switched at a high frequency, torque density may be increased.

Figure 4:
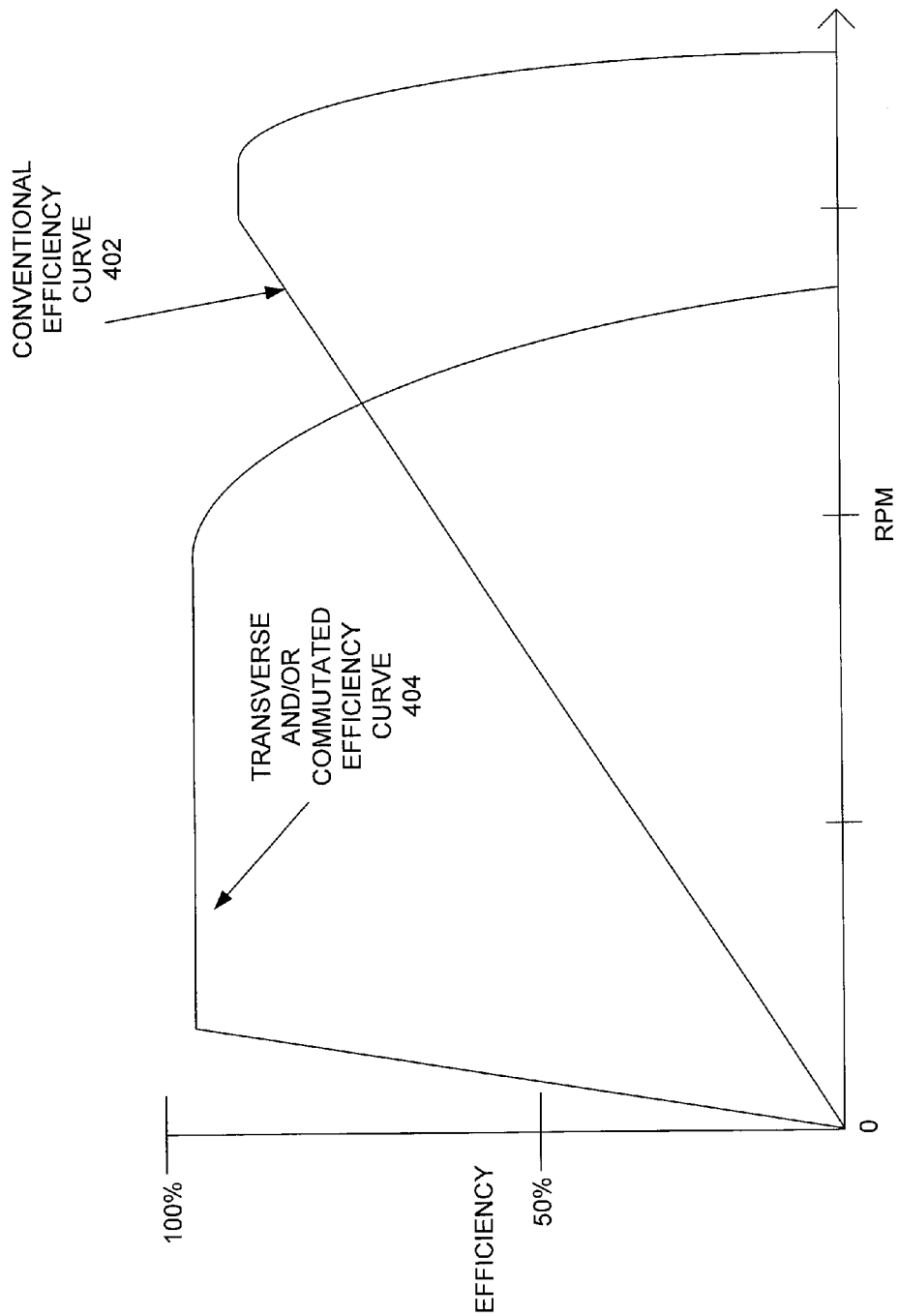
FIG. 4 illustrates electric motor efficiency curves in accordance with an exemplary embodiment.

With reference now to FIG. 4, a typical conventional electric motor efficiency curve 402 for a particular torque is illustrated. Revolutions per minute (RPM) is illustrated on the X axis, and motor efficiency is illustrated on the Y axis. As illustrated, a conventional electric motor typically operates at a comparatively low efficiency at low RPM. For this conventional motor, efficiency increases and then peaks at a particular RPM, and eventually falls off as RPM increases further. As a result, many conventional electric motors are often desirably operated within an RPM range near peak efficiency. For example, one particular prior art electric motor may have a maximum efficiency of about 90% at about 3000 RPM, but the efficiency falls off dramatically at RPMs that are not much higher or lower.

Gearboxes, transmissions, and other mechanical mechanisms are often coupled to an electric motor to achieve a desired output RPM or other output condition. However, such mechanical components are often costly, bulky, heavy, and/or impose additional energy losses, for example frictional losses. Such mechanical components can reduce the overall efficiency of the motor/transmission system. For example, an electric motor operating at about 90% efficiency coupled to a gearbox operating at about 70% efficiency results in a motor/gearbox system having an overall efficiency of about 63%. Moreover, a gearbox may be larger and/or weigh more or cost more than the conventional electric motor itself. Gearboxes also reduce the overall reliability of the system.

In contrast, with continuing reference to FIG. 4 and in accordance with principles of the present disclosure, a transverse and/or commutated flux machine efficiency curve 404 for a particular torque is illustrated. In accordance with principles of the present disclosure, a transverse and/or commutated flux machine may rapidly reach a desirable efficiency level (for example, 80% efficiency or higher) at an RPM lower than that of a conventional electric motor. Moreover, the transverse and/or commutated flux machine may maintain a desirable efficiency level across a larger RPM range than that of a conventional electric motor. Additionally, the efficiency of the transverse and/or commutated flux machine may fall off more slowly past peak efficiency RPM as compared to a conventional electric motor.

Furthermore, in accordance with principles of the present disclosure, a transverse and/or commutated flux machine may achieve a torque density higher than that of a conventional electric motor. For example, in an exemplary embodiment a transverse and/or commutated flux machine may achieve a continuous, thermally stable torque density in excess of 100 Newton-meters per kilogram.

Thus, in accordance with principles of the present disclosure, a transverse and/or commutated flux machine may desirably be employed in various applications. For example, in an automotive application, a transverse and/or commutated flux machine may be utilized as a wheel hub motor, as a direct driveline motor, and/or the like. Moreover, in an exemplary embodiment having a sufficiently wide operational RPM range, particularly at lower RPMs, a transverse and/or commutated flux machine may be utilized in an automotive application without need for a transmission, gearbox, and/or similar mechanical components.

An exemplary electric or hybrid vehicle embodiment comprises a transverse flux motor for driving a wheel of the vehicle, wherein the vehicle does not comprise a transmission, gearbox, and/or similar mechanical component(s). In this exemplary embodiment, the electric or hybrid vehicle is significantly lighter than a similar vehicle that comprises a transmission-like mechanical component. The reduced weight may facilitate an extended driving range as compared to a similar vehicle with a transmission like mechanical component. Alternatively, weight saved by elimination of the gearbox allows for utilization of additional batteries for extended range. Moreover, weight saved by elimination of the gearbox allows for additional structural material for improved occupant safety. In general, a commutated flux machine having a broad RPM range of suitable efficiency may desirably be utilized in a variety of applications where a direct-drive configuration is advantageous. For example, a commutated flux machine having an efficiency greater than 80% over an RPM range from only a few RPMs to about 2000 RPMs may be desirably employed in an automobile.

Moreover, the exemplary transmissionless electric or hybrid vehicle may have a higher overall efficiency. Stated otherwise, the exemplary vehicle may more efficiently utilize the power available in the batteries due to the improved efficiency resulting from the absence of a transmission-like component between the motor and the wheel of the vehicle. This, too, is configured to extend driving range and/or reduce the need for batteries.

Additionally, the commutated flux machine is configured to have a high torque density.

In accordance with principles of the present disclosure, the high torque density commutated flux machine is also well suited for use in various applications, for example automotive applications. For example, a conventional electric motor may have a torque density of between about 0.5 to about 3 Newton-meters per kilogram. Additional techniques, for example active cooling, can enable a conventional electric motor to achieve a torque density of up to about 50 Newton-meters per kilogram. However, such techniques typically add significant additional system mass, complexity, bulk, and/or cost. Additionally, such conventional electric motors configured to produce comparatively high amounts of torque, for example the Siemens 1FW6 motor, are limited to comparatively low RPM operation, for example operation below 250 RPMs.

In contrast, in accordance with principles of the present disclosure, an exemplary passively cooled transverse flux machine and/or commutated flux machine may be configured with a continuous, thermally stable torque density in excess of 50 Newton-meters per kilogram. As used herein, "passively cooled" is generally understood to refer to systems without cooling components requiring power for operation, for example water pumps, oil pumps, cooling fans, and/or the like. Moreover, this exemplary transverse flux machine and/ or commutated flux machine may be configured with a compact diameter, for example a diameter less than 14 inches. Another exemplary transverse flux machine and/or commutated flux machine may be configured with a continuous, thermally stable torque density in excess of 100 Newton-meters per kilogram and a diameter less than 20 inches. Accordingly, by utilizing various principles of the present disclosure, exemplary transverse flux machines and/or commutated flux machines may be sized and/or otherwise configured and/or shaped in a manner suitable for mounting as a wheel hub motor in an electric vehicle, because the transverse flux machine and/or commutated flux machine is significantly lighter and/or more compact than a conventional electric motor. In this manner, the unsprung weight of the resulting wheel/motor assembly can be reduced. This can improve vehicle handling and reduce the complexity and/or size of suspension components.

Further, in accordance with principles of the present disclosure, a transverse flux machine and/or commutated flux machine may desirably be utilized in an electromechanical system having a rotating portion, for example a washing machine or other appliance. In one example, a conventional washing machine typically utilizes an electric motor coupled to a belt drive to spin the washer drum. In contrast, a transverse flux machine and/or commutated flux machine may be axially coupled to the washer drum, providing a direct drive configuration and eliminating the belt drive element. Alternatively, a transverse flux machine and/or commutated flux machine, for example one comprising a partial stator, may be coupled to a rotor. The rotor may have a common axis as the washer drum. The rotor may also be coupled directly to the washer drum and/or integrally formed therefrom. In this manner, a transverse flux machine and/or commutated flux machine may provide rotational force for a washing machine or other similar electromechanical structures and/or systems.

Moreover, in accordance with principles of the present disclosure, a transverse flux machine and/or commutated flux machine may desirably be utilized to provide mechanical output to relatively lightweight vehicles such as bicycles, scooters, motorcycles, quads, golf carts, or other vehicles. Additionally, a transverse flux machine and/or commutated flux machine may desirably be utilized in small engine applications, for example portable generators, power tools, and other electrical equipment. A transverse flux machine and/or commutated flux machine may desirably be utilized to provide mechanical output to propeller-driven devices, for example boats, airplanes, and/or the like. A transverse flux machine and/or commutated flux machine may also desirably be utilized in various machine tools, for example rotating spindles, tables configured to move large masses, and/or the like. In general, transverse flux machines and/or commutated flux machines may be utilized to provide electrical and/or mechanical input and/or output to and/or from any suitable devices.

In various exemplary embodiments, a commutated flux machine comprises a rotor having a multipath configuration. In general, a multipath rotor for a commutated flux machine may comprise any structure, assembly, and/or mechanism or device configured to provide a plurality of flux paths between a plurality of first flux concentrating stator portions and a plurality of second flux concentrating stator portions. Stated another way, a multipath rotor can provide a "many to many" flux switch configuration for a commutated flux machine.

Figure 5A:
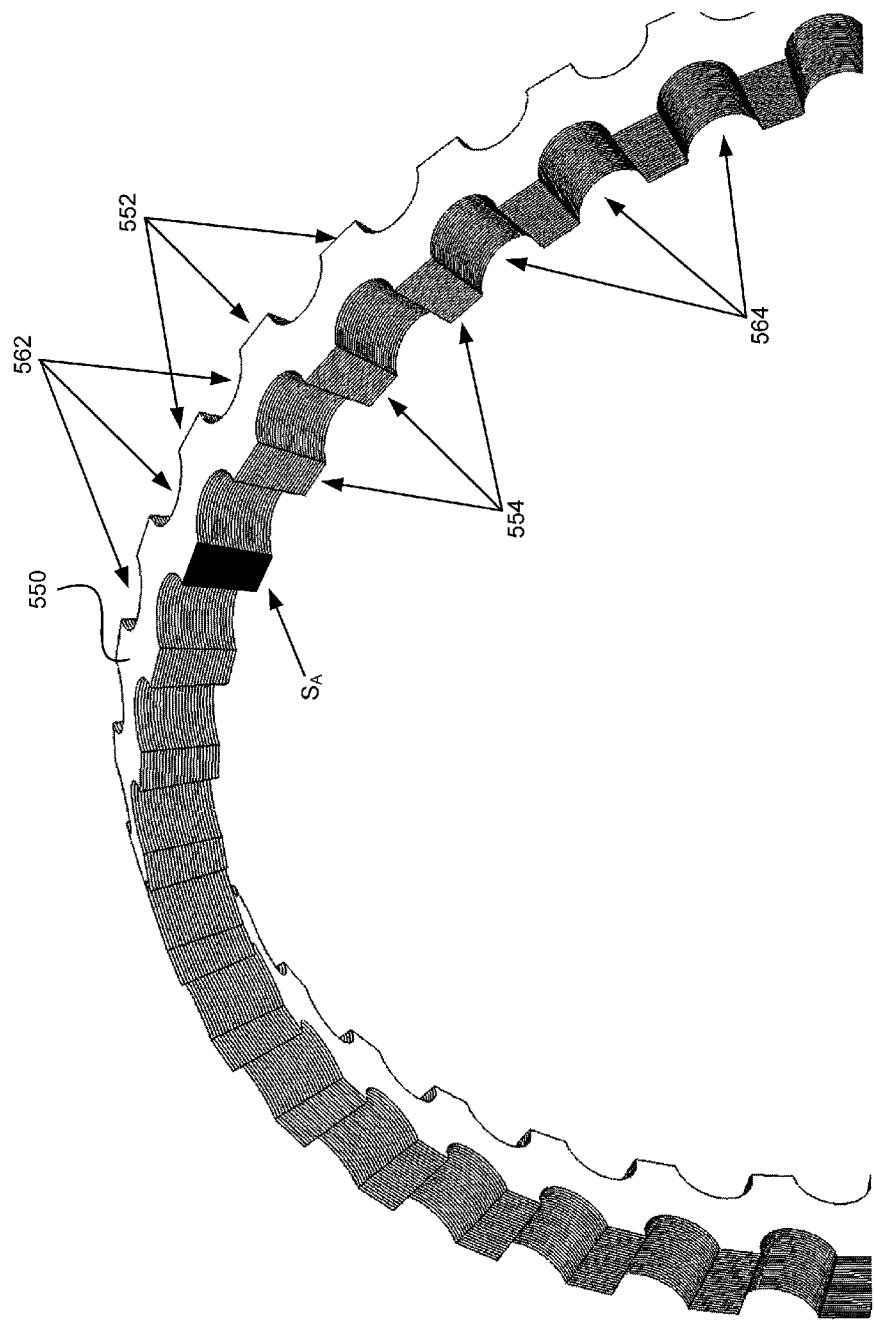
FIG. 5A illustrates an exemplary tape wound multipath rotor in accordance with an exemplary embodiment.

In an exemplary embodiment, and with reference now to FIG. 5A, a multipath rotor 550 comprises a generally ring-shaped structure having a first set of "elbows" 552 on a first side of multipath rotor 550. Multipath rotor 550 further comprises a second set of elbows 554 on a second side of multipath rotor 550. In a commutated flux machine, at least a portion of multipath rotor 550 is configured to act as a flux switch for a stator. For example, one or more elbows of the first set of elbows 552, or portions thereof, may each act as a flux switch. Similarly, one or more elbows of the second set of elbows 554, or portions thereof, may each act as a flux switch. Flux may thus be conducted across an air gap in a stator between one or more of the first set of elbows 552 and one or more of the second set of elbows 554.

In another exemplary embodiment, multipath rotor 550 comprises a generally ring-shaped structure having a first set of trenches 562, inscribed on a first side of the ring. Portions of the ring remaining between the first set of trenches comprise a first set of flux switches. Multipath rotor 550 further comprises a second set of trenches 564 inscribed on a second side of the ring. Portions of the ring remaining between the second set of trenches comprise a second set of flux switches. In accordance with one exemplary embodiment, for a multipath rotor 550 having a radial gap configuration, the first side may also be considered to be the outside of the ring, and the second side may also be considered to be the inside of the ring.

In accordance with various exemplary embodiments, trenches 562 and/or 564 may comprise various shapes. For example, a trench may comprise a cylindrical shape, elliptical shape, a triangular shape, a rectangular shape, a trapezoidal shape, and/or any suitable shape(s).

In accordance with various exemplary embodiments, an elbow may be formed by repeatedly removing partially cylindrical portions from a generally ring-shaped block of material. In this manner, an elbow may be formed such that the elbow comprises two arcuate sides, and the elbow may taper outwardly.

In another example, an elbow may be formed by repeatedly removing generally V-shaped portions from a generally ring-shaped block of material. In this manner, an elbow may be formed such that the elbow comprises two generally planar sides. Moreover, the depth, angle, and/or other parameters of the generally V-shaped cut may be varied. In this manner, the thickness of the elbows may be varied.

In yet another example, multipath rotor 550 may be formed by molding a desired shape from powdered metal or other suitable material. Multipath rotor 550 may also be formed by cutting layers of a planar material, for example tape-like steel, into a configuration having various elbow and/or trench shapes. The tape-like material may then be wound about a mandrel, for example a mandrel configured with guidance features for controlling alignment of the tape-like material. In this manner, position, size, and/or other tolerances may be controlled during creation of multipath rotor 550.

Furthermore, in between each trench and/or v-shaped removed portion, a portion of multipath rotor 550 may remain at its original shape. Thus, in various exemplary embodiments, elbows 552 and/or 554 may represent un-cutaway portions. The center to center distance between adjacent elbows may be any suitable distance. In various exemplary embodiments, the center to center distance may be a function of a pole pitch in a commutated flux machine. The on-center spacing between the elbows may similarly be varied, for example in order to cause an on-center spacing between certain elbows to align with an on-center spacing between flux concentrating stator portions in a particular stator.

In addition, the edge to edge distance for any one elbow may be any suitable distance. In certain exemplary embodiments, the edge to edge distance for any one elbow may be considered to be a switch thickness.

The switch area of multipath rotor 550 may be selected to facilitate use of multipath rotor 550 with a particular stator. With momentary reference to FIG. 1B, in a cavity engaged configuration, "switch area" refers to the product of a switch thickness (for example, $S_T$) and an engagement depth (for example, $E_D$). In a cavity engaged configuration, engagement depth $E_D$ may be considered to be a length along a switch (for example, a length along a portion of rotor 150B) where it extends into a cavity (for example, the cavity at least partially defined by stator 110B).

Figure 3C:
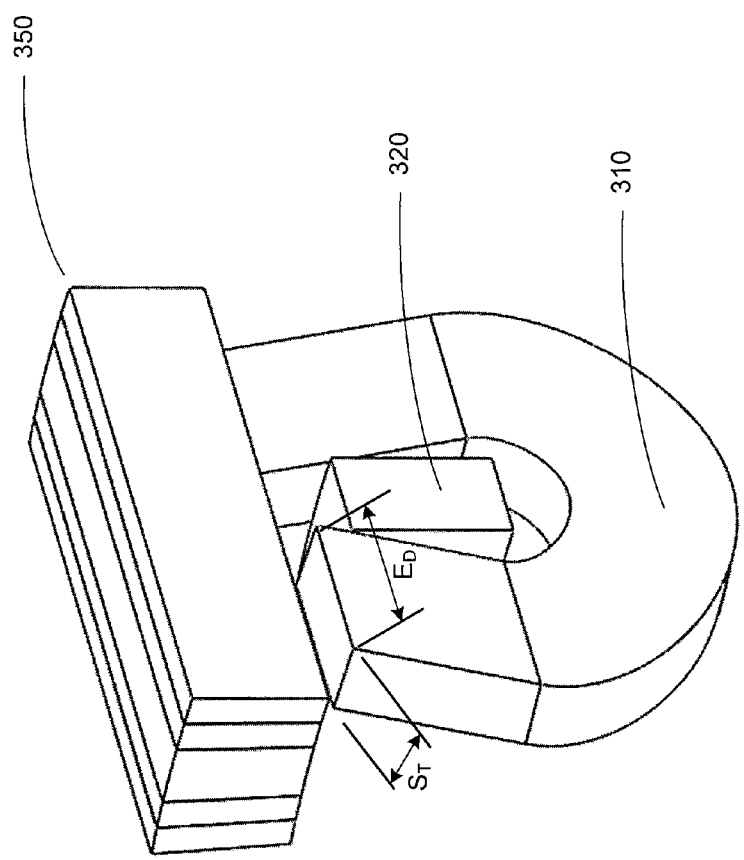
FIG. 3C illustrates an exemplary face engaged transverse flux configuration in accordance with an exemplary embodiment.

With momentary reference to FIG. 3C, in a face engaged configuration, "switch area" refers to the product of a switch thickness (for example, $S_T$) and an engagement depth (for example, $E_D$). In a face engaged configuration, engagement depth $E_D$ may be considered to be a length along a switch (for example, a length along a portion of stator 310) where it closely approaches a corresponding portion of a rotor and/or stator (for example, rotor 350).

In an exemplary embodiment, one or more elbows may be formed on multipath rotor 550 in order to create a desired switch area on a surface of each elbow, for example at the end of each elbow.

In general, one or more elbows and/or other portions of multipath rotor 550 may be formed via any suitable process, technique, or methodology, as desired, in order to create a flux switch having a desired switch area at a surface of an elbow. Additionally, as will be appreciated by one skilled in the art, similar processes, techniques, and/or methodologies may be applied to form other electrical components, for example single-path rotors, stators, flux switches, and/or other flux conducting portions of a commutated flux machine.

Moreover, multipath rotor 550 may comprise any suitable elbows, extensions, extrusions, protrusions, trenches, gaps, flanges, geometries, and/or structures configured to provide a plurality of flux paths between a plurality of first flux concentrating stator portions and a plurality of second flux concentrating stator portions. For example, multipath rotor 550 may be configured with a sawtooth pattern, a zig-zag pattern, an interlocking diamond pattern, a square wave pattern, and/or the like, or combinations of the same.

In various exemplary embodiments, at least a portion of multipath rotor 550 may be configured with a varied on-center distance between elbows. For example, a first portion of multipath rotor 550 may be configured with a first on-center distance D1 between adjacent elbows. Additionally, a second portion of multipath rotor 550 may be configured with a second on-center distance D2 between adjacent elbows. D1 and D2 may be the same, or they may be different. For example, D2 may be twice the distance D1. D2 may also be three times the distance D1. Moreover, D1 and D2 may be any suitable distances and may have any suitable relationship.

Varied on-center distances may be advantageous. For example, in an exemplary embodiment, when multipath rotor 550 is coupled to a partial stator and/or a gapped stator in a commutated flux machine, multipath rotor 550 may be configured to cause the commutated flux machine to produce a first torque when the first portion of multipath rotor 550 engages a stator. Similarly, multipath rotor 550 may be configured to cause the commutated flux machine to produce a second torque when the second portion of multipath rotor 550 engages a stator. The second torque may be different from the first torque, for example due to the fact that as the distance between elbows on multipath rotor 550 increases, the number of flux concentrating stator portions engaged by multipath rotor 550 decreases.

In various exemplary embodiments, when a commutated flux machine is operated as a generator, multipath rotor 550 may be configured to align a "higher torque" portion of multipath rotor 550 (i.e., a portion of multipath rotor 550 having a smaller on-center distance between adjacent elbows) with a stator at a time when mechanical input is comparatively strong (for example, during the power stroke of a 4-stroke engine). Similarly, multipath rotor 550 may be configured to align a "lower torque" portion of multipath rotor 550 (i.e., a portion of multipath rotor 550 having a larger on-center distance between adjacent elbows) with a stator at a time when mechanical input is less strong (for example, during the exhaust, intake, and/or compression strokes of a 4-stroke engine). In this manner, a commutated flux machine may be configured to more efficiently convert a varying mechanical input, for example mechanical output generated by a 4-stroke piston engine, into electrical energy.

In accordance with various exemplary embodiments, multipath rotor 550 may be formed in any suitable manner to provide a plurality of flux paths between a plurality of first flux concentrating stator portions and a plurality of second flux concentrating stator portions. For example, multipath rotor 550 may be formed by removing material from a ring-shaped piece of monolithic material (e.g., silicon steel) as previously discussed. Moreover, multipath rotor 550 may be cast, pressed, sintered, die-cut, machined, stamped, bonded, laminated, polished, smoothed, bent, molded, plated, coated, and/or otherwise shaped and/or formed via any suitable method. For example, multipath rotor 550 may be created via a method configured to create a first set of elbows and a second set of elbows along opposing sides of a generally ring-like structure.

Figure 5B:
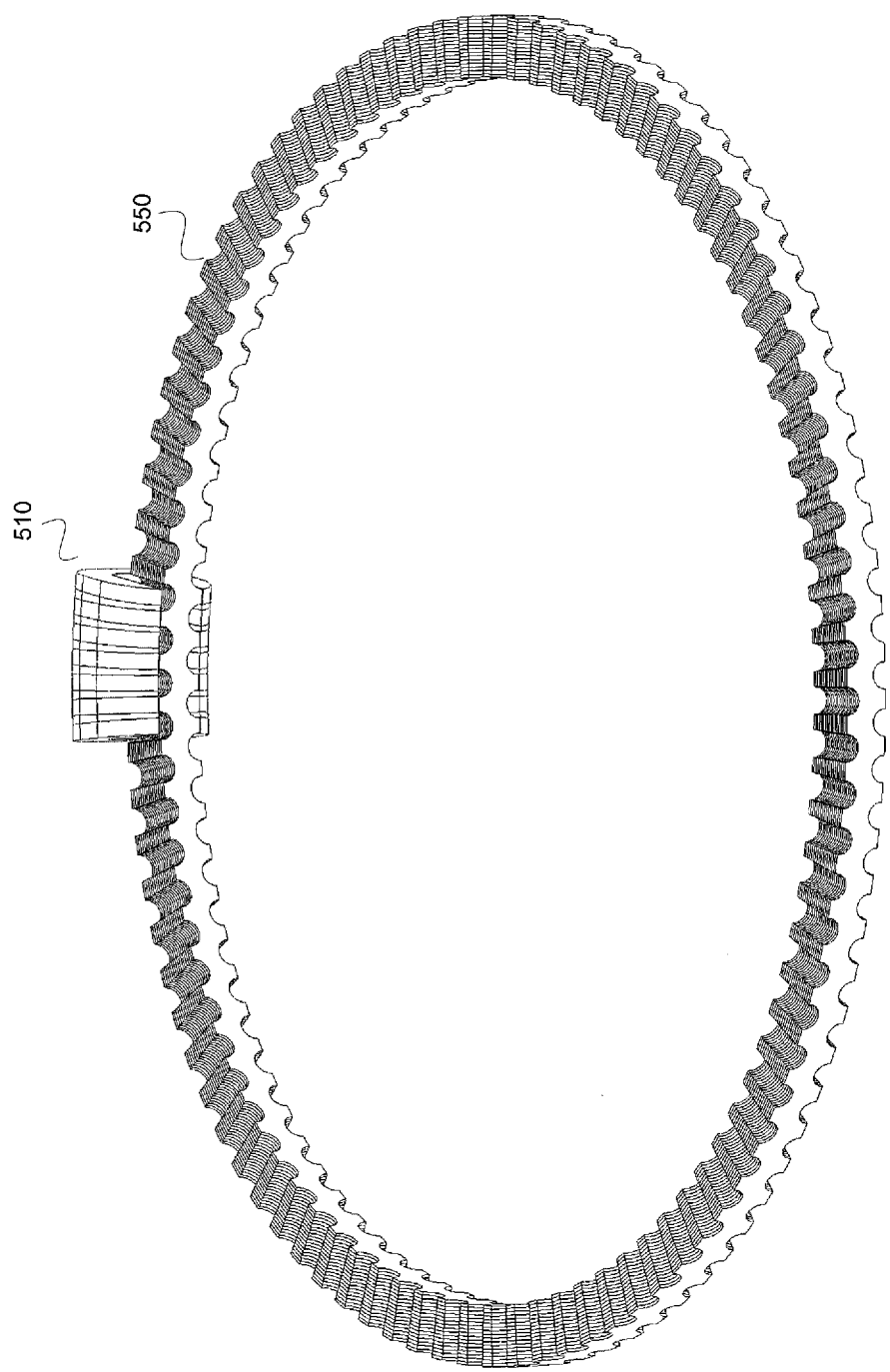
FIG. 5B illustrates an exemplary tape wound multipath rotor and an exemplary partial stator in accordance with an exemplary embodiment.
Figure 5C:
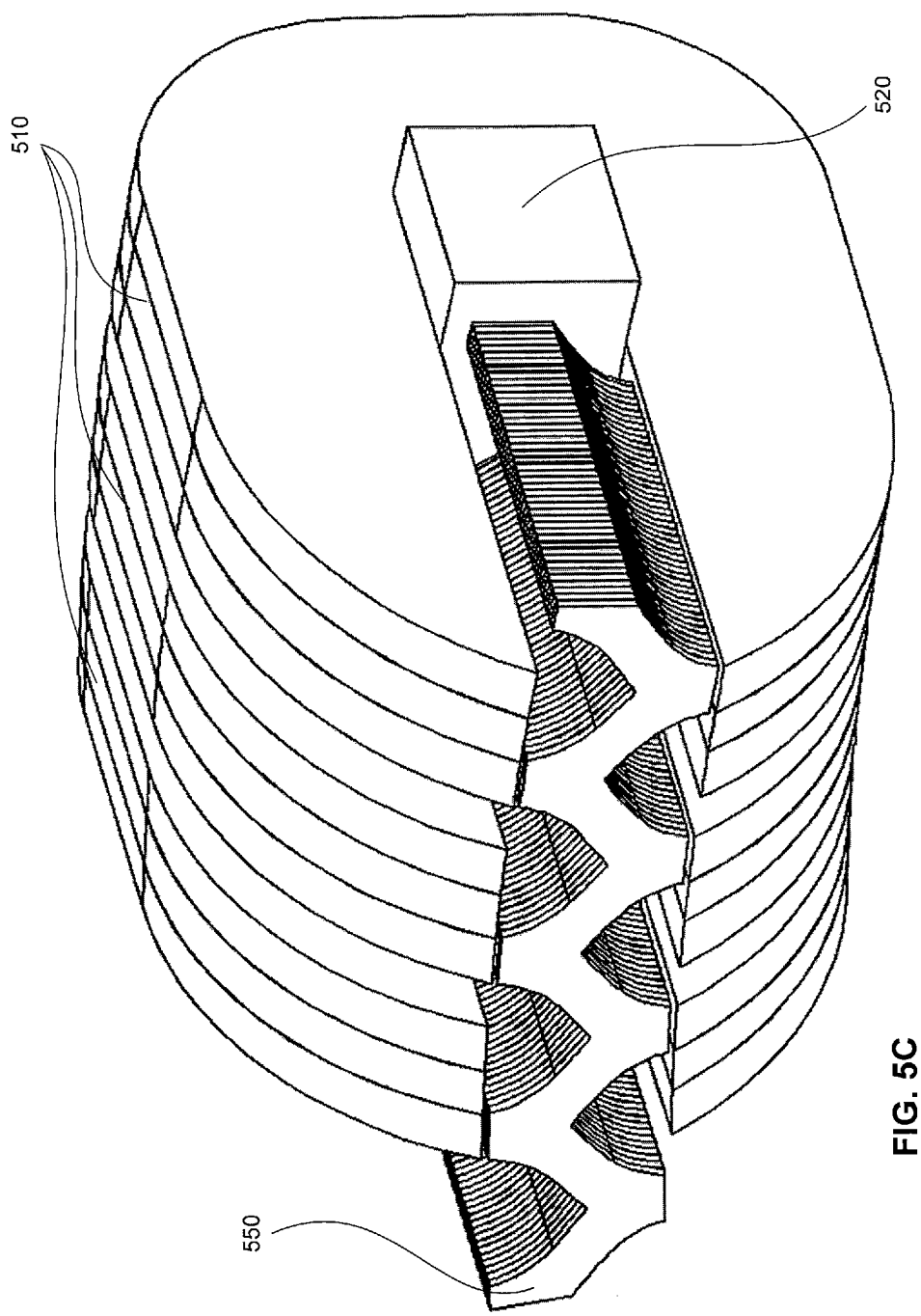
FIG. 5C illustrates an exemplary tape wound multipath rotor and a plurality of exemplary gapped stators in accordance with an exemplary embodiment.

In one exemplary embodiment, and with reference now to FIG. 5C, multipath rotor 550 is formed by laminating and/or otherwise bonding multiple layers of material. For example, a particular multipath rotor 550 intended for use in a radial gap commutated flux machine may be formed from multiple layers of laminated planar material. Multipath rotor 550 may then be cut or otherwise formed from the multiple-layer material, for example via water jet cutting, laser cutting, and/or any other suitable technique or process. Alternatively, individual layers of planar material may first be cut, and then stacked, laminated, pressed, and/or otherwise bonded or aligned in order to form multipath rotor 550. The resulting multipath rotor 550 may be considered to be comprised of a "stack" of similar multipath rotors 550, each stacked multipath rotor 550 being of comparatively thin planar material.

When intended for use in a radial gap commutated flux machine, the plane of each layer of the rotor stack is substantially parallel to the plane of rotation of the rotor. Thus, when cavity engaged with a radial gap stator, for example stator 510 at least partially enclosing coil 520, the plane of each layer of the rotor stack traverses the resulting air gap. Stated another way, flux within multipath rotor 550 may remain substantially within a layer of the rotor stack, rather than across layers within the rotor stack. Because the layers of planar material in the rotor stack tend to conduct magnetic flux substantially within the layer, magnetic flux is conducted more efficiently. Because electrical resistance is higher across the layers, flux leakage, eddy currents, and other undesirable effects are thus reduced.

In accordance with another exemplary embodiment, and with reference again to FIG. 5A, a particular multipath rotor 550 intended for use in an axial gap commutated flux machine may be formed from a wound planar material. For example, a planar material may be wound about a mandrel. Multipath rotor 550 may then be cut or otherwise formed from the wound planar material, for example via water jet cutting, laser cutting, and/or any other suitable technique or process. When multipath rotor 550 so formed is cavity engaged with an axial gap stator, the plane of each wound layer of the rotor traverses the resulting air gap. As before, because the layers of wound planar material tend to conduct magnetic flux substantially within the layer, and because electrical resistance is higher across the layers, flux leakage, eddy currents, and other undesirable effects are reduced.

In various exemplary embodiments, multipath rotor 550 is formed from multiple types of stacked, wound, or otherwise joined material. For example, a particular multipath rotor 550 may be formed from alternating layers of planar material. The layers may have different properties. In an exemplary embodiment, multipath rotor 550 is formed from alternating layers of amorphous metal (e.g., Metglas® 2605SA1) and nanocrystalline composite. In another exemplary embodiment, multipath rotor 550 is formed from alternating layers of silicon steel and nanocrystalline composite. In various other exemplary embodiments, multipath rotor 550 is formed from a layer of amorphous metal and a layer of nanocrystalline composite wound together about a mandrel. In yet other exemplary embodiments, multipath rotor 550 is formed from alternating layers of three or more materials. Moreover, multipath rotor 550 may be formed from any suitable combination of layers and/or materials joined by any suitable process, for example two layers of a first material, then one layer of a second material, then again two layers of the first material, then one layer of the second material, and so on.

By utilizing layers of multiple materials in this manner, multipath rotor 550 can have improved mechanical, magnetic, and/or other properties. For example, multipath rotor 550 may have improved machineability while retaining desirable magnetic, thermal, electrical, or other properties. In an exemplary embodiment, multipath rotor 550 formed from multiple layered materials is configured with a bulk saturation induction in excess of 1.0 Tesla. In another exemplary embodiment, multipath rotor 550 formed from multiple layered materials is configured with a bulk permeability in excess of 1,000μ.

Moreover, in addition to multipath rotor 550, other electrical components, including stators, flux switches, coils, flux concentrators, molded rotors, and/or the like, may be at least partially formed from, contain, and/or comprise layers of material, molded materials, and/or multiple materials as discussed hereinabove. All such components and methodologies are considered to be within the scope of the present disclosure.

In various exemplary embodiments, multipath rotor 550 may be utilized in connection with a radial gap commutated flux machine. Moreover, in various other exemplary embodiments, multipath rotor 550 may be utilized in connection with an axial gap commutated flux machine, for example a commutated flux machine configured with a partial stator (see, for example, FIG. 5B). In general, multipath rotor 550 may be used in any suitable commutated flux machine and/or transverse flux machine, as desired.

Moreover, in various exemplary embodiments, the engagement depth of multipath rotor 550 into a stator may be varied. The air gap between multipath rotor 550 and the stator may also be controlled and/or adjusted, for example by coupling multipath rotor 550 to a stator via guide wheels, bumpers, and/or the like. By varying the engagement depth of multipath rotor 550 into a cavity at least partially defined by a stator, various properties of a commutated flux machine may desirably be controlled, varied, and/or otherwise modified.

For example, reducing the engagement depth may result in a reduced voltage constant. Similarly, reducing the engagement depth may result in a reduced torque constant. Moreover, reducing the engagement depth may increase the efficiency of a commutated flux machine. Reduced engagement depth may also permit higher RPM operation with the same drive electronics. A desired performance characteristic, for example operation at a particular efficiency level, may thus be obtained by varying the engagement depth in a suitable manner.

Additionally, when a commutated flux machine is operated as a generator, varying the engagement depth can provide a suitable response to a varying load. For example, at a particular load, a first engagement depth may be sufficient to produce a desired output. At a larger load, a second engagement depth may be sufficient to produce a desired output. The engagement depth may thus be varied responsive to changing load conditions on the generator.

Figure 5D:
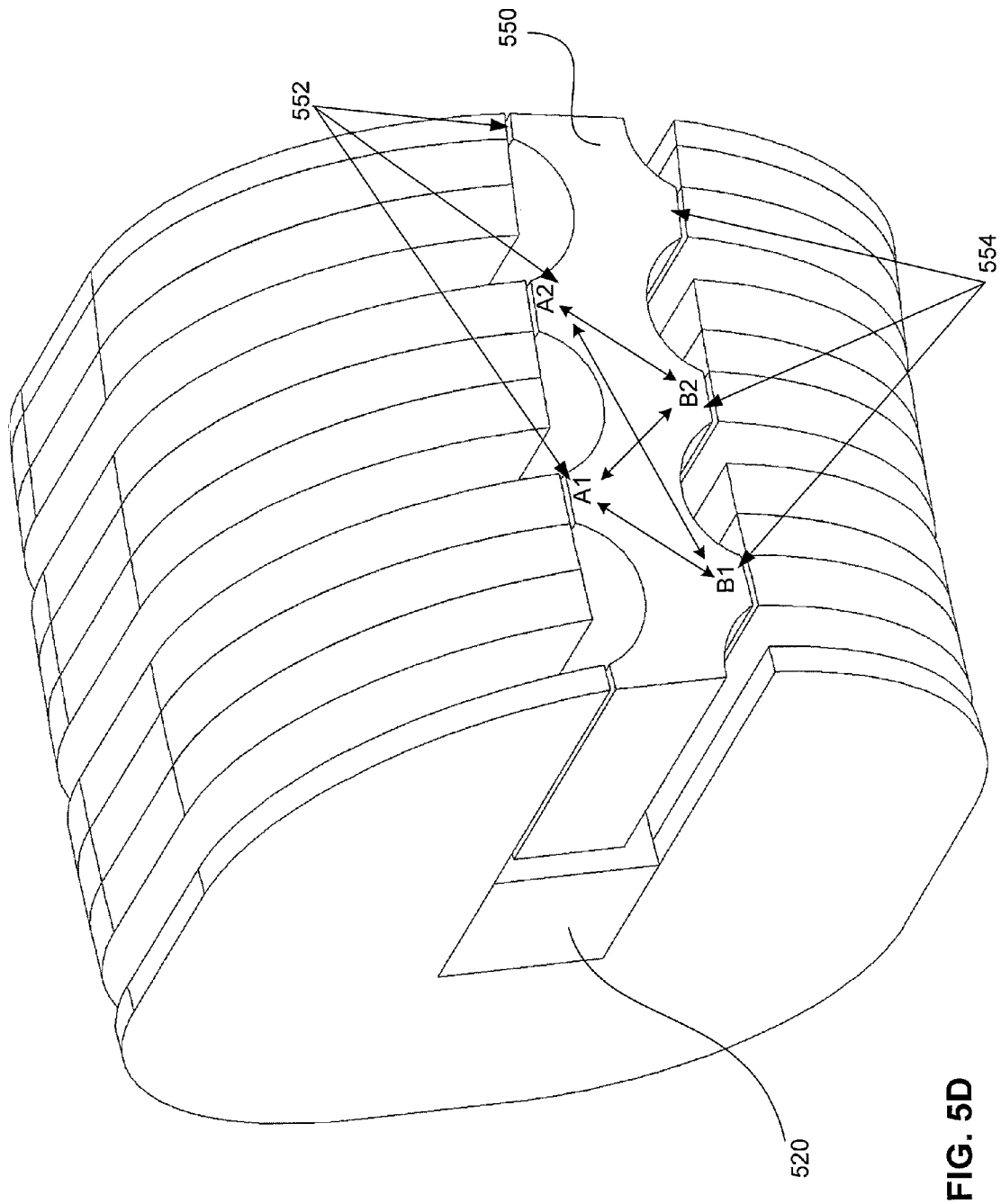
FIG. 5D illustrates an exemplary multipath rotor providing a "many to many" flux switch configuration with a plurality of exemplary gapped stators in accordance with an exemplary embodiment.

With reference now to FIG. 5B, in various exemplary embodiments multipath rotor 550 may be operatively coupled to a partial stator. With further reference to FIG. 5D, multipath rotor 550 may be constructed such that a particular elbow A1 of a first set of elbows 552 aligns with a first flux concentrating stator portion having a first polarity. An adjacent elbow A2 of the first set of elbows 552 aligns with a second flux concentrating stator portion having a same polarity as the first polarity. Simultaneously, a particular elbow B1 of a second set of elbows 554 aligns with a third flux concentrating stator portion having an opposite polarity as the first polarity. Similarly, an adjacent elbow B2 of the second set of elbows 554 aligns with a fourth flux concentrating stator portion also having an opposite polarity as the first polarity, and so on.

In this manner, magnetic flux may be conducted through multipath rotor 550 from either of A1 or A2 to either of B1 or B2 (or vice versa), as shown by the illustrated arrows. Moreover, because each of the flux switches associated with the first set of elbows 552 is magnetically coupled to every other flux switch of the first set of elbows 552, and to every flux switch associated with the second set of elbows 554, magnetic flux may be conducted through multipath rotor 550 from any flux switch engaging a flux concentrating stator portion of a first polarity to any flux switch engaging a flux concentrating stator portion having a polarity opposite the first polarity. Additionally, with momentary reference to FIG. 5E, flux from any particular flux switch (for example, switch B1) may be conducted to multiple other flux switches (for example, switches A1, A2, and A3).

Thus, in general, in an exemplary embodiment, multipath rotor 550 is configured such that magnetic flux may be conducted within a commutated flux machine in a "many to many" arrangement. Stated another way, magnetic flux may flow from any of a plurality of magnetic flux "sources" (i.e., flux concentrating stator portions having a first polarity) into any of a plurality of magnetic flux "sinks" (i.e., flux concentrating stator portions having a polarity opposite the first polarity). In other words, magnetic flux may enter multipath rotor 550 at any of the first set of elbows 552, and depart the rotor at any of the second set of elbows 554, or vice versa.

Additionally, in a "one to one" flux switching configuration, a flux concentrating stator portion located at or near the edge of a partial stator may at times be unutilized. This is because a flux switch associated with that flux concentrating stator portion extends out past the end of the partial stator, and thus from time to time does not engage with a corresponding flux concentrating stator portion having an opposite polarity. Via use of multipath rotor 550 providing a "many to many" flux switching configuration, a flux concentrating stator portion located at or near the edge of a partial stator is provided with a flux path to a flux concentrating stator portion of opposite polarity when flux switches on multipath rotor 550 are spaced and/or otherwise aligned in a suitable manner. Thus, flux available in each flux concentrating stator portion in the partial stator may be more fully utilized and/or more effectively switched, leading to improved torque density, improved output power, and so forth.

Moreover, in addition to being suitable for use with a partial stator, in various exemplary embodiments multipath rotor 550 may desirably be utilized in connection with a gapped stator, a fully circular stator, and/or any other stator for a commutated flux machine and/or combinations of the same.

In general, multipath rotor 550 may be designed, shaped, and/or otherwise configured, as desired, for use in an electrical machine, for example a commutated flux machine and/or transverse flux machine. In various exemplary embodiments, with momentary reference to FIG. 5A, multipath rotor 550 may be configured with a switch area $S_A$, where $S_A$ is the product of a switch thickness and an engagement depth. Similarly, a corresponding stator may be configured with a flux concentrator area $C_A$, where $C_A$ is the product of a flux concentrator thickness and an engagement depth.

Figure 5E:
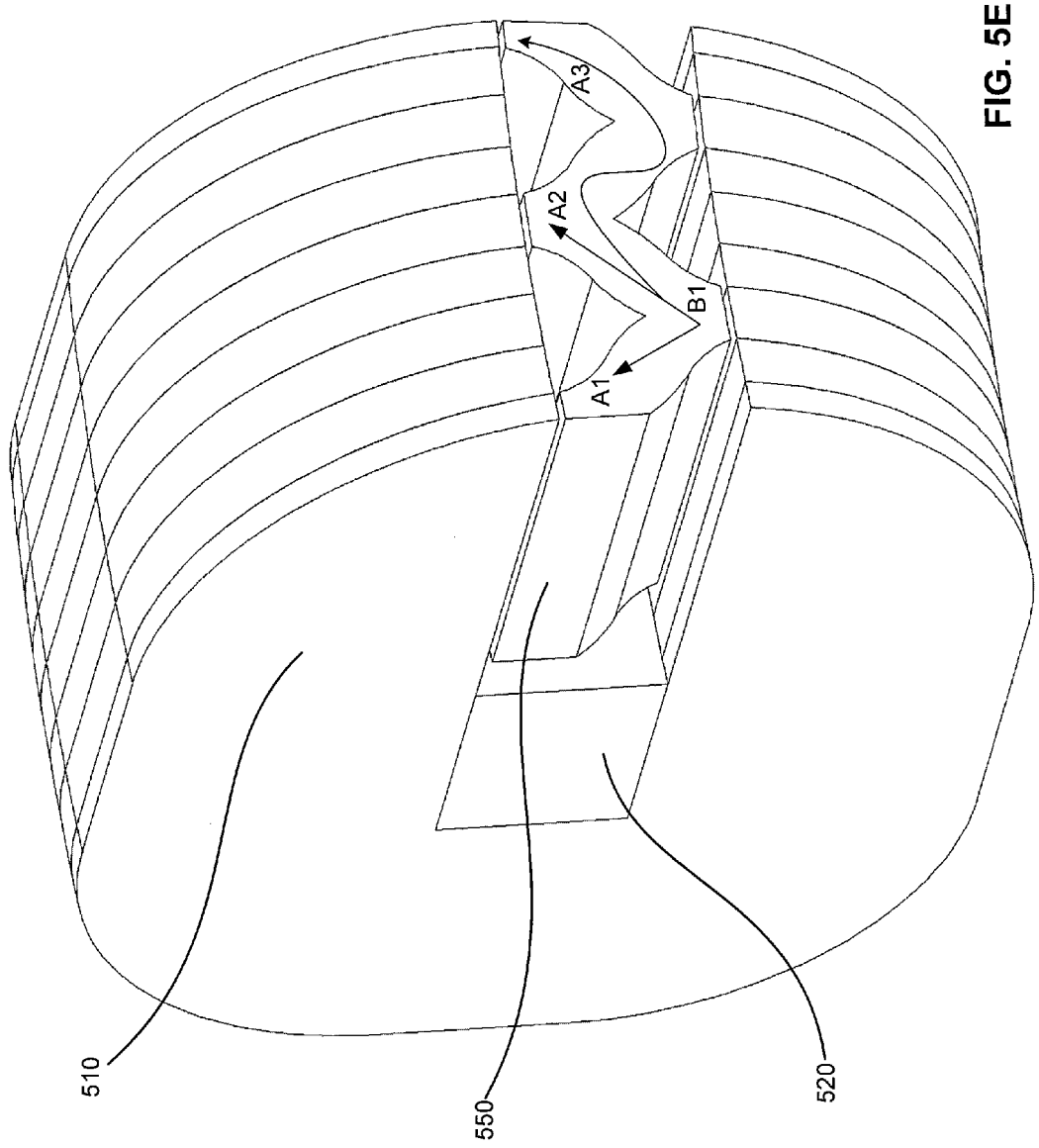
FIG. 5E illustrates an exemplary multipath rotor providing a "many to many" flux switch configuration with an exemplary partial stator in accordance with an exemplary embodiment.

In various exemplary embodiments, and with reference to FIG. 5E, multipath rotor 550 is configured for use in a cavity engaged commutated flux machine. In these embodiments, multipath rotor 550 is configured to at least partially engage within a cavity defined by a stator in order to conduct magnetic flux, as illustrated by FIG. 5E. In other exemplary embodiments, multipath rotor 550 is configured for use in a face engaged commutated flux machine. In these embodiments, multipath rotor 550 is configured to closely approach a stator in order to conduct magnetic flux. Additionally, a molded rotor body may have flux switches configured in a multipath pattern mounted on a face of the molded rotor body.

Moreover, a suitable rotor providing a "many to many" flux switch configuration, for example multipath rotor 550, may be utilized in various transverse and/or commutated flux machines, as desired.

It will be readily appreciated by one skilled in the art that various principles of the present disclosure illustrated hereinabove with respect to multipath rotors, for example principles of construction and use, are equally suitable for utilization in connection with single path rotors, flux switches, flux concentrators, stators, and/or other flux conducting components of various transverse and/or commutated flux machines.

In addition to multipath type rotors and tape wound rotors disclosed hereinabove, principles of the present disclosure contemplate "molded" rotors for transverse and/or commutated flux machines. In accordance with various exemplary embodiments, a molded rotor for a commutated flux machine may comprise any structure, assembly, and/or mechanism or device configured to provide a flux path between a first flux concentrating stator portion and a second flux concentrating stator portion. Moreover, in certain exemplary embodiments a molded rotor may function as a multipath rotor.

Figure 6A:
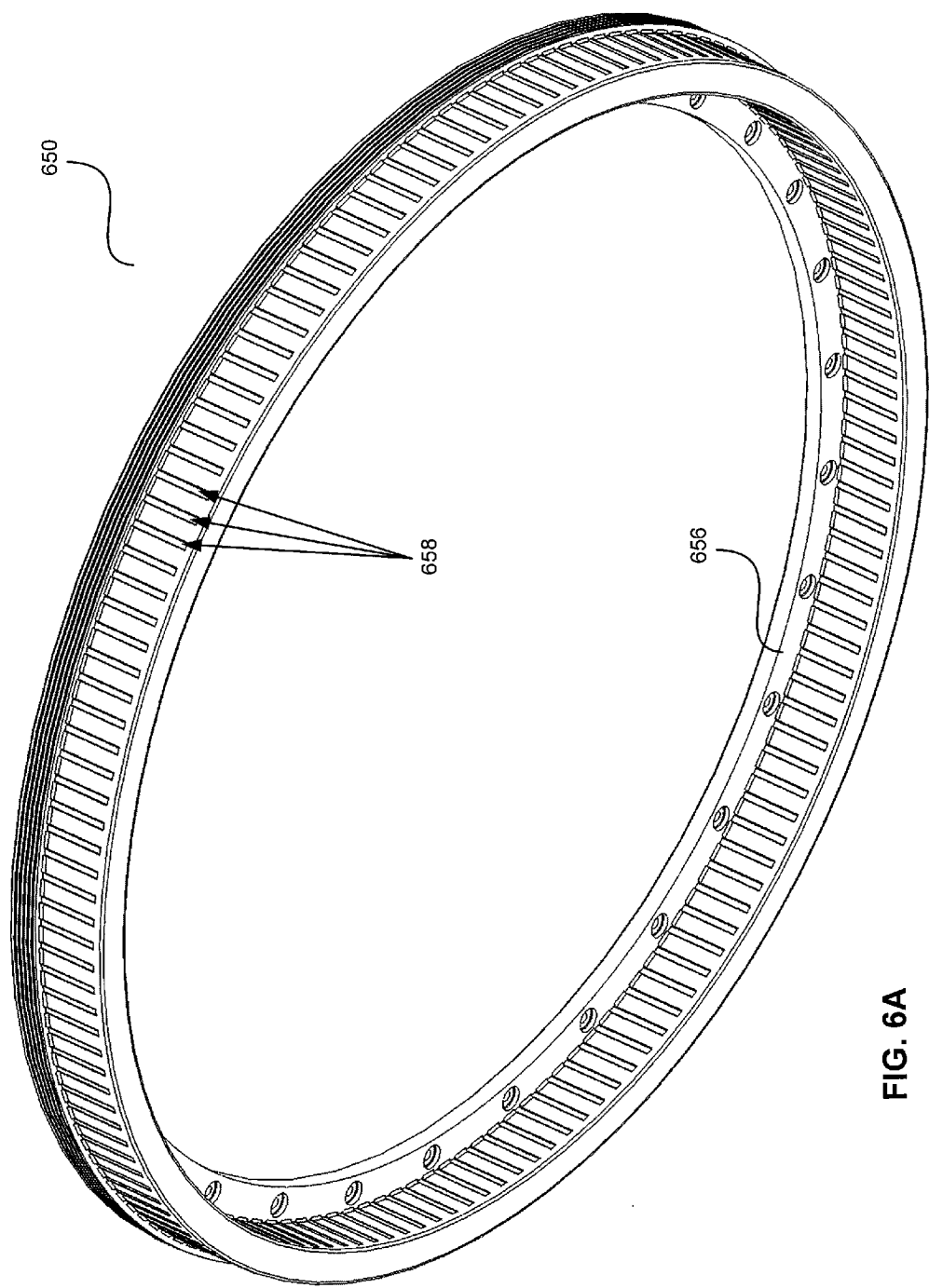
FIG. 6A illustrates an exemplary molded rotor in accordance with an exemplary embodiment.
Figure 6B:
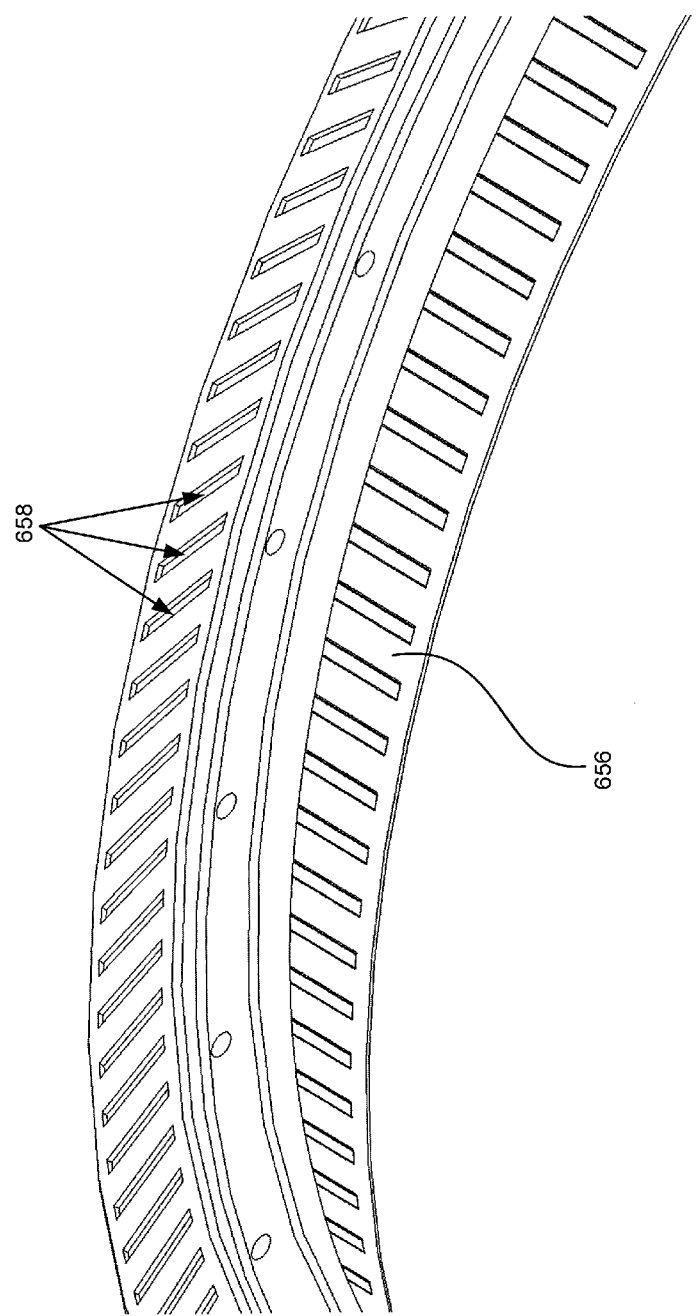
FIG. 6B illustrates a closer view of an exemplary molded rotor comprising a rotor frame and a plurality of flux switches in accordance with an exemplary embodiment.
Figure 6C:
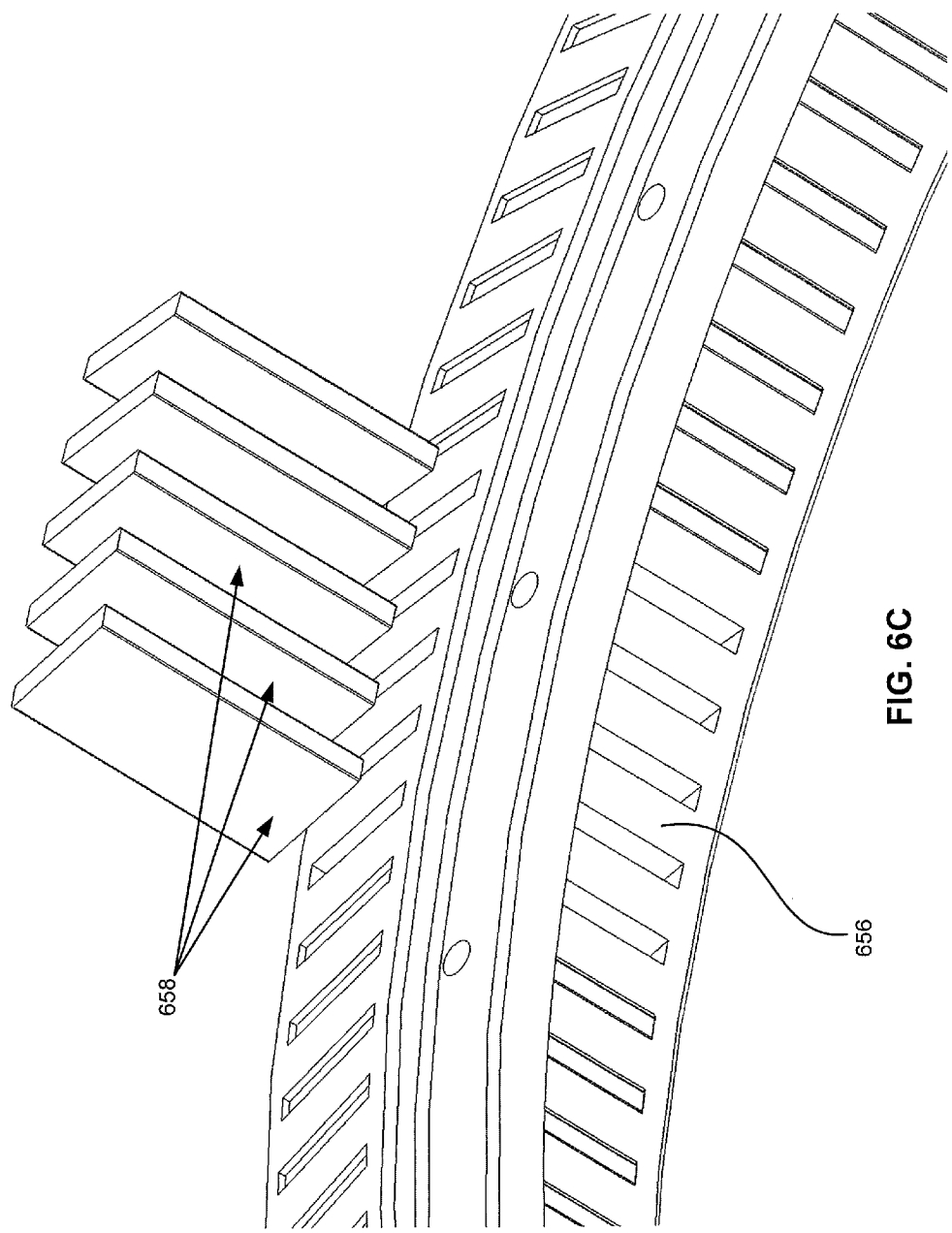
FIG. 6C illustrates coupling of flux switches within cavities in a rotor frame in accordance with an exemplary embodiment.

In an exemplary embodiment, with reference now to FIGS. 6A to 6C, a molded rotor 650 comprises a rotor body 656 and a plurality of flux switches 658. Flux switches 658 are coupled to rotor body 656. Molded rotor 650 is configured to interface with a stator having one or more flux concentrating stator portions.

Molded rotor body 656 may comprise any material or combinations of materials configured to support, guide, align, and/or otherwise interface with flux switches 658. In various exemplary embodiments, molded rotor body 656 comprises a material having a desirable low permeability, for example a permeability only slightly larger than air or less than that of air (i.e., less than about 2μ). Molded rotor body 656 may also comprise a non-ferrous material. Molded rotor body 656 may also comprise a material having a high thermal conductivity. Molded rotor body 656 may also comprise a material having a high bulk electrical resistivity. In various exemplary embodiments, molded rotor body 656 comprises one or more of ceramics, plastics, ceramic-filled plastics, glass-filled plastics, liquid crystal polymers, and/or combinations of the same.

Molded rotor body 656 may be formed via any suitable method and/or process. For example, in various exemplary embodiments molded rotor body 656 may be formed via one or more of injection molding, compression molding, pressing, sintering, cutting, grinding, abrading, polishing, and/or the like.

In an exemplary embodiment, molded rotor body 656 is monolithic. In various exemplary embodiments, molded rotor body 656 comprises multiple components joined, fastened, welded, and/or otherwise engaged in order to form molded rotor body 656. In other exemplary embodiments, molded rotor body 656 comprises multiple materials. Moreover, molded rotor body 656 may comprise various non-ferrous metals, for example aluminum, as desired. Molded rotor body 656 may also comprise various cavities, trenches, extrusions, bosses, slots, and/or the like, configured to at least partially accept, bond with, contain, and/or couple to flux switches 658.

Flux switches 658 may comprise any materials, shapes, and/or structures configured to conduct magnetic flux, for example between flux concentrating stator portions. In various exemplary embodiments, flux switches 658 comprise one or more of powdered metals, silicon steel, cobalt steel, nickel steel, amorphous metals (e.g., Metglas® 2605SA1), or nanocrystalline composites. Moreover, flux switches 658 may comprise monolithic material. Flux switches 658 may also comprise layered material. Further, flux switches 658 may comprise any suitable material or materials usable to conduct magnetic flux. For example, flux switches 658 may be configured with a suitable bulk saturation induction, for example a bulk saturation induction in excess of 1.0 Tesla. Flux switches 658 may also be configured with a suitable bulk permeability, for example a permeability in excess of 1,000μ. Moreover, flux switches 658 may also comprise materials having a high electrical resistivity.

In certain exemplary embodiments, with reference to FIG. 6B, flux switches 658 may be configured to be fully contained within molded rotor body 656 when coupled to molded rotor body 656. In these configurations, molded rotors 650 are well suited for use with commutated flux machines having a face engaged stator configuration. In other exemplary embodiments, flux switches 658 are configured to extend at least partially beyond molded rotor body 656 when coupled to molded rotor body 656. In these configurations, molded rotors 650 are well suited for use with commutated flux machines having a cavity engaged stator configuration. However, as will be readily appreciated by one skilled in the art, partially extended flux switches 658 may also be suited for use in a face engaged configuration, and fully contained flux switches 658 may also be suited for use in a cavity engaged stator configuration.

In various exemplary embodiments, flux switches 658 may be sized, aligned, angled, spaced, placed, and/or otherwise configured to provide a "one to one" connection between flux concentrating stator portions. Stated another way, a particular flux switch 658 may be configured to simultaneously engage a first flux concentrating stator portion having a first polarity and a second flux concentrating stator portion having an opposite polarity. In this manner, via a particular flux switch 658, a flux path is provided across an air gap in a stator between one magnetic flux "source" and one magnetic flux "sink."

In other exemplary embodiments, one or more flux switches 658 may be linked, joined, connected, aligned, placed, and/or otherwise configured within molded rotor 650 to provide a "many to many" connection between flux concentrating stator portions. Stated another way, in these embodiments magnetic flux may flow through molded rotor 650 from any one of a plurality of magnetic flux "sources" (i.e., flux concentrating stator portions having a first polarity) across an air gap in a stator into any of a plurality of magnetic flux "sinks" (i.e., flux concentrating stator portions having an opposite polarity as the first polarity).

By providing a "many to many" flux switch arrangement, molded rotor 650 may improve performance of various electrical machines, including commutated flux machines utilizing partial and/or gapped stators. For example, in a "one to one" flux switching configuration, a flux concentrating stator portion located at or near the edge of a partial stator may at times be unutilized. This is because a flux switch associated with that flux concentrating stator portion extends out past the end of the partial stator, and thus from time to time does not engage with a corresponding flux concentrating stator portion having an opposite polarity. Via use of molded rotor 650 providing a "many to many" flux switching configuration, a flux concentrating stator portion located at or near the edge of a partial stator is provided with a flux path to a flux concentrating stator portion of opposite polarity when flux switches 658 on molded rotor 650 are spaced and/or otherwise aligned in a suitable manner. Thus, each flux concentrating stator portion in the partial stator may be more fully utilized, leading to improved torque density, improved output power, and so forth.

By coupling a molded rotor body 656 to one or more flux switches 658, the resulting molded rotor 650 may have desirable mechanical, thermal, magnetic, and/or other properties. For example, molded rotor body 656 may comprise a material significantly less dense than material within flux switches 658. The mass of molded rotor 650 may thus be reduced, which can be desirable in order to reduce total rotating mass in a motor. Further, molded rotor body 656 may comprise a material having a low permeability compared to material within flux switches 658. Flux leakage within molded rotor 650 may thus be desirably reduced.

Moreover, molded rotor body 656 may comprise a less expensive material than material within flux switches 658. Molded rotor 650 may thus be produced in a more cost-effective manner. Molded rotor body 656 may also comprise a material more easily machined than material within flux switches 658. Higher dimensional accuracy of, improved strength of, and/or reduced difficulty of production of molded rotor 650 may thus be achieved. Molded rotor body 656 may also comprise fan-like portions or other components configured to deflect air, for example in order to direct airflow across a stator portion responsive to rotation of molded rotor body 656. In this manner, improved cooling for a commutated flux machine may be achieved.

Moreover, in various exemplary embodiments, a particular molded rotor body 656 may also be configured to accept, contain, and/or otherwise couple with a particular multipath rotor 550, as desired. In this manner, molded rotor body 656 may provide structural support to multipath rotor 550, allowing components of multipath rotor 550 to be modified, for example to make components of multipath rotor thinner and/or smaller. In this manner, components of multipath rotor 550 may also be selected based primarily on magnetic considerations, as molded rotor body 656 may provide mechanical, thermal, and/or structural support to multipath rotor 550.

In addition to the rotors discussed hereinabove, principles of the present disclosure contemplate "folded" rotors. As used herein, a "folded" rotor is a rotor comprising a material at least partially folded, bent, and/or otherwise shaped to form a flux switch. In accordance with various exemplary embodiments, a folded rotor for a transverse flux machine and/or commutated flux machine may comprise any structure, assembly, materials, and/or mechanism or device configured to provide a flux path between a first flux concentrating stator portion and a second flux concentrating stator portion. Moreover, in certain exemplary embodiments a folded rotor may function as a multipath rotor.

In an exemplary embodiment, with reference now to FIGS. 7A-7F, a folded rotor 750 comprises a rotor body 756 and flux conducting material 758. Flux conducting material 758 is coupled to rotor body 756. Folded rotor 750 is configured to interface with a stator having one or more flux concentrating stator portions. In various exemplary embodiments, flux conducting material 758 comprises a layered material, for example layers of amorphous metal.

In various exemplary embodiments, portions of flux conducting material 758 may be formed to function as flux switches. For example, a continuous portion of flux conducting material 758 may be placed at least partially within one or more trenches, grooves, and/or other pathways and/or features on rotor body 756. For example, with momentary reference to FIG. 7F, flux conducting material 758 may be "threaded" and/or otherwise interleaved and/or passed through alternating trenches, for example in a serpentine manner, a back-and-forth manner, and/or the like.

In various exemplary embodiments, multiple segments of flux conducting material 758 may be utilized. For example, a first segment of flux conducting material 758A may be threaded through a first portion of rotor body 756. A second segment of flux conducting material 758B may be threaded through a second portion of rotor body 756. With reference again to FIG. 7F, the ends of segments 758A and 758B may be adjacent, abutting, and/or otherwise closely aligned, for example at junction J1. Additional flux conducting segments, for example segment 758C, may be configured in a similar manner, and may connect with and/or otherwise be adjacent to and/or abut other portions of flux conducting material 758, for example at junction J2. In this manner, flux conducting material 758, for example flux conducting material 758 available in a limited length, may be fully threaded about rotor body 756 (see, e.g., FIG. 7E). Moreover, flux conducting material 758 may suitably be threaded through and/or otherwise coupled to any suitable portion of rotor body 756, as desired.

Once flux conducting material 758 is coupled to rotor body 756, flux conducting 758 and/or rotor body 756 may be processed, formed, shaped, and/or otherwise configured, as desired, for example in order to form one or more flux switches. In an exemplary embodiment, portions of flux conducting material 758 extending beyond trenches in rotor body 756 are ground off to form a substantially smooth surface. Moreover, portions of flux conducting material 758 may be cut, ground, abraded, sliced, polished, and/or otherwise mechanically and/or chemically processed in order to form one or more flux switches.

Figure 7A:
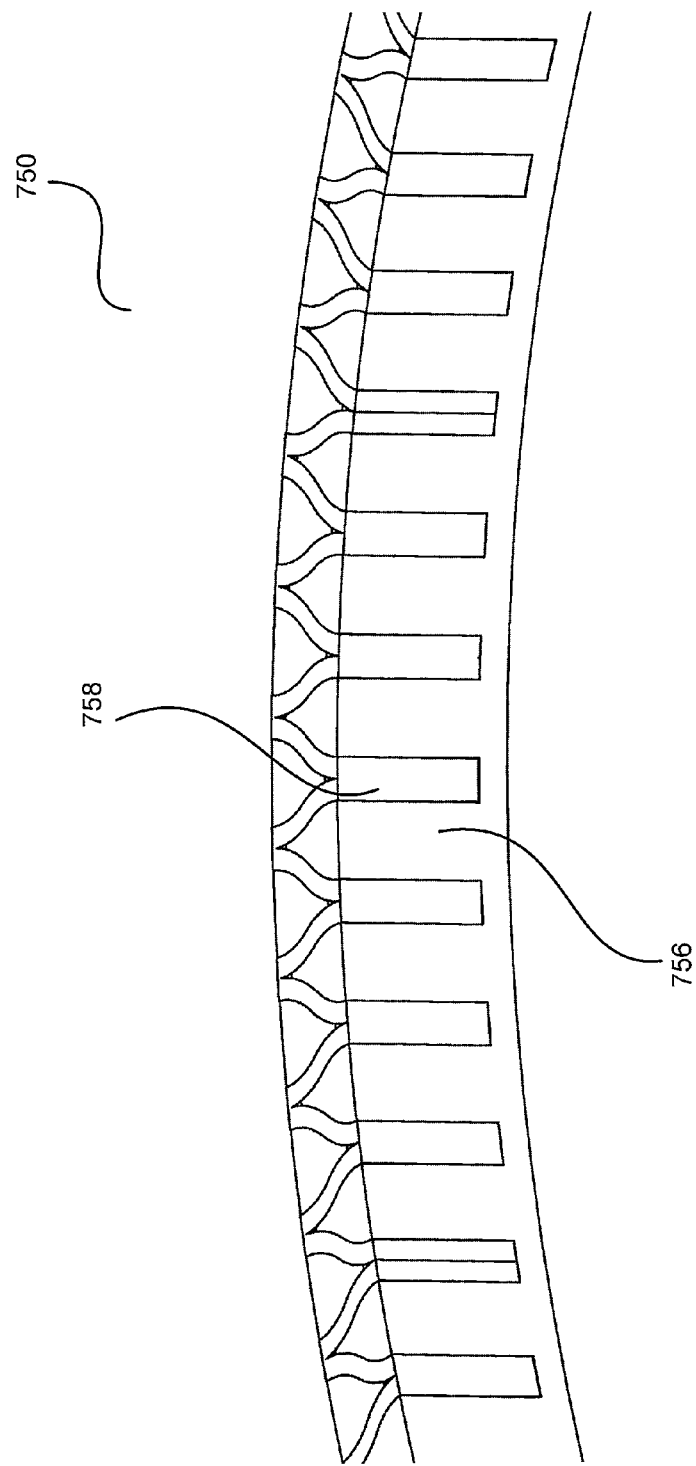
FIG. 7A illustrates an exemplary folded rotor in accordance with an exemplary embodiment.
Figure 7B:
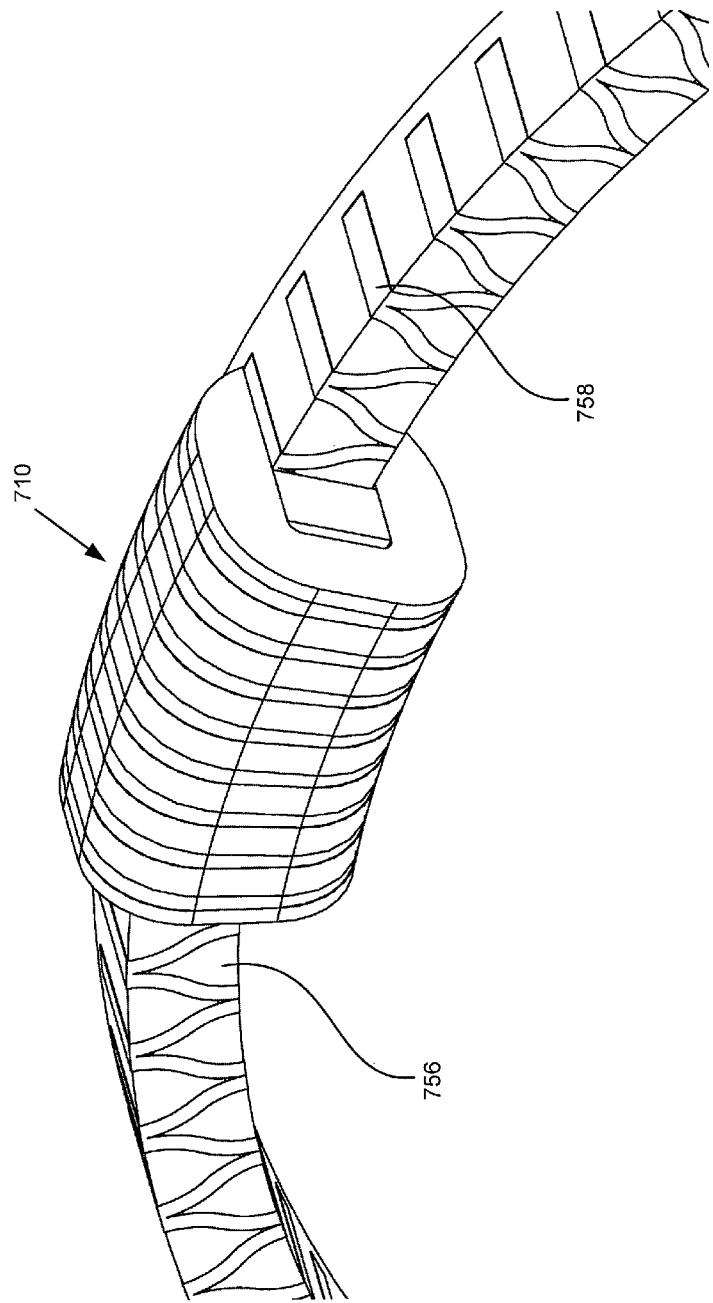
FIG. 7B illustrates an exemplary folded rotor coupled to an exemplary partial stator in accordance with an exemplary embodiment.
Figure 7C:
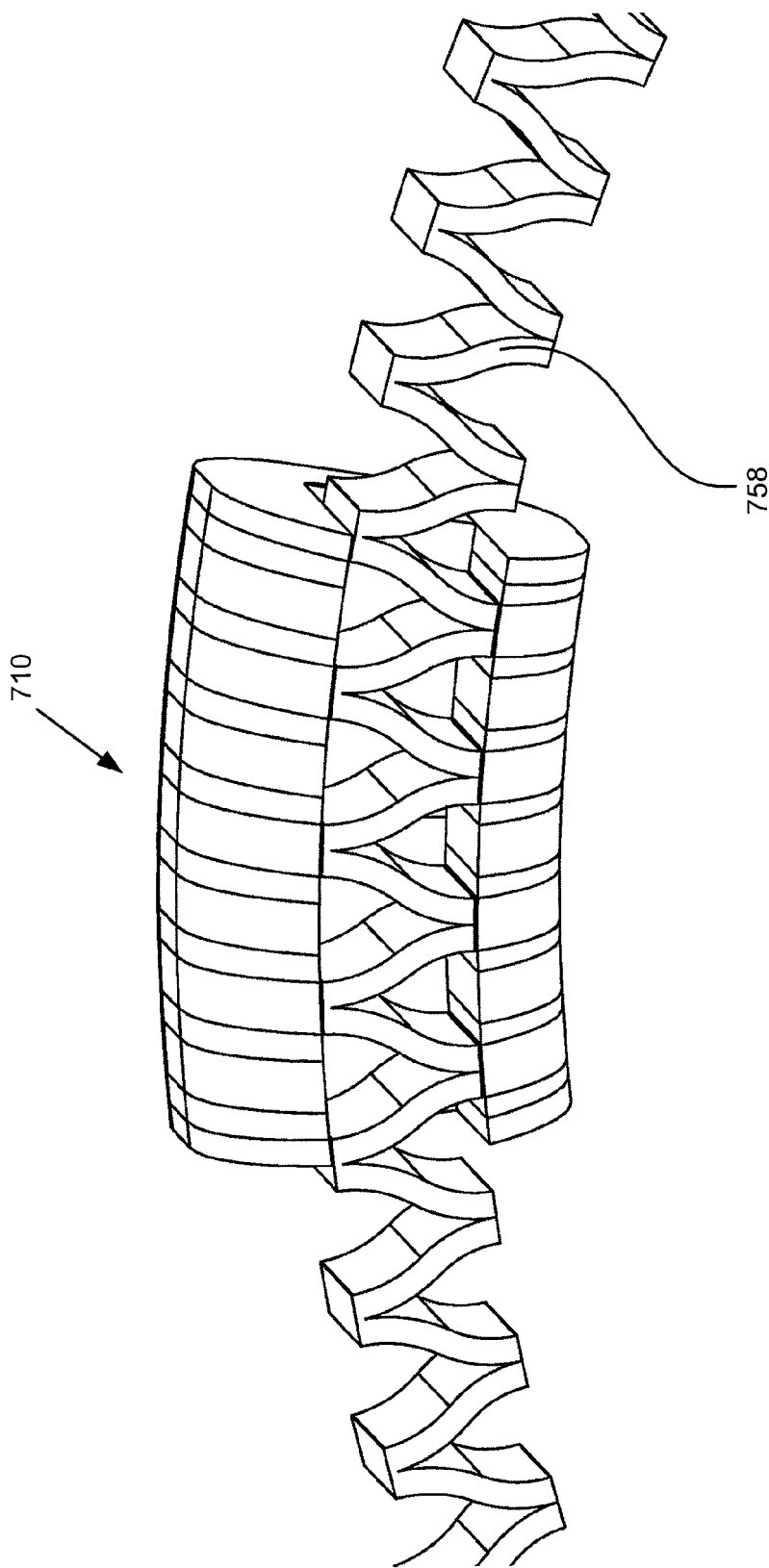
FIG. 7C illustrates exemplary flux switch portions of a folded rotor coupled to an exemplary partial stator in accordance with an exemplary embodiment.
Figure 7D:
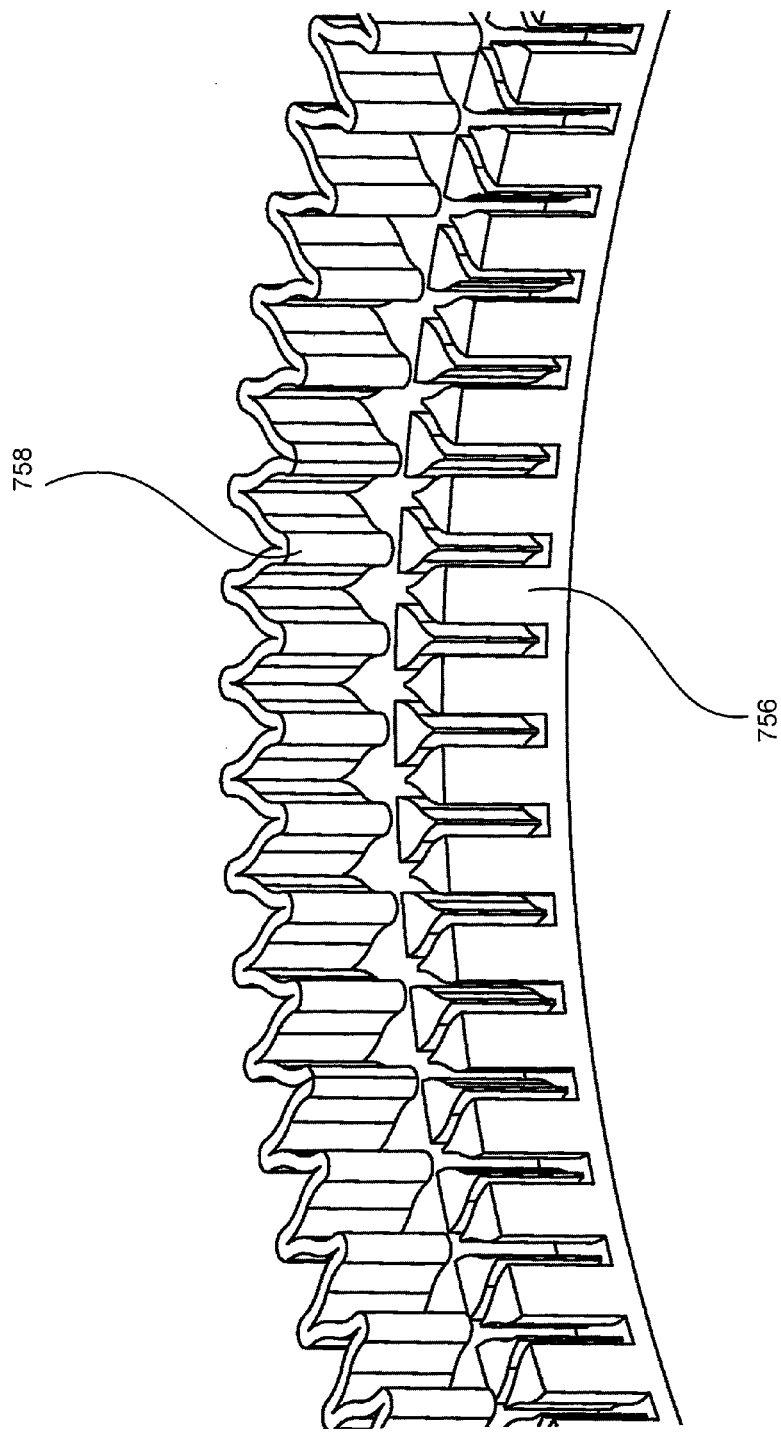
FIG. 7D illustrates an exploded view of exemplary flux switch material and an exemplary folded rotor frame in accordance with an exemplary embodiment.
Figure 7E:
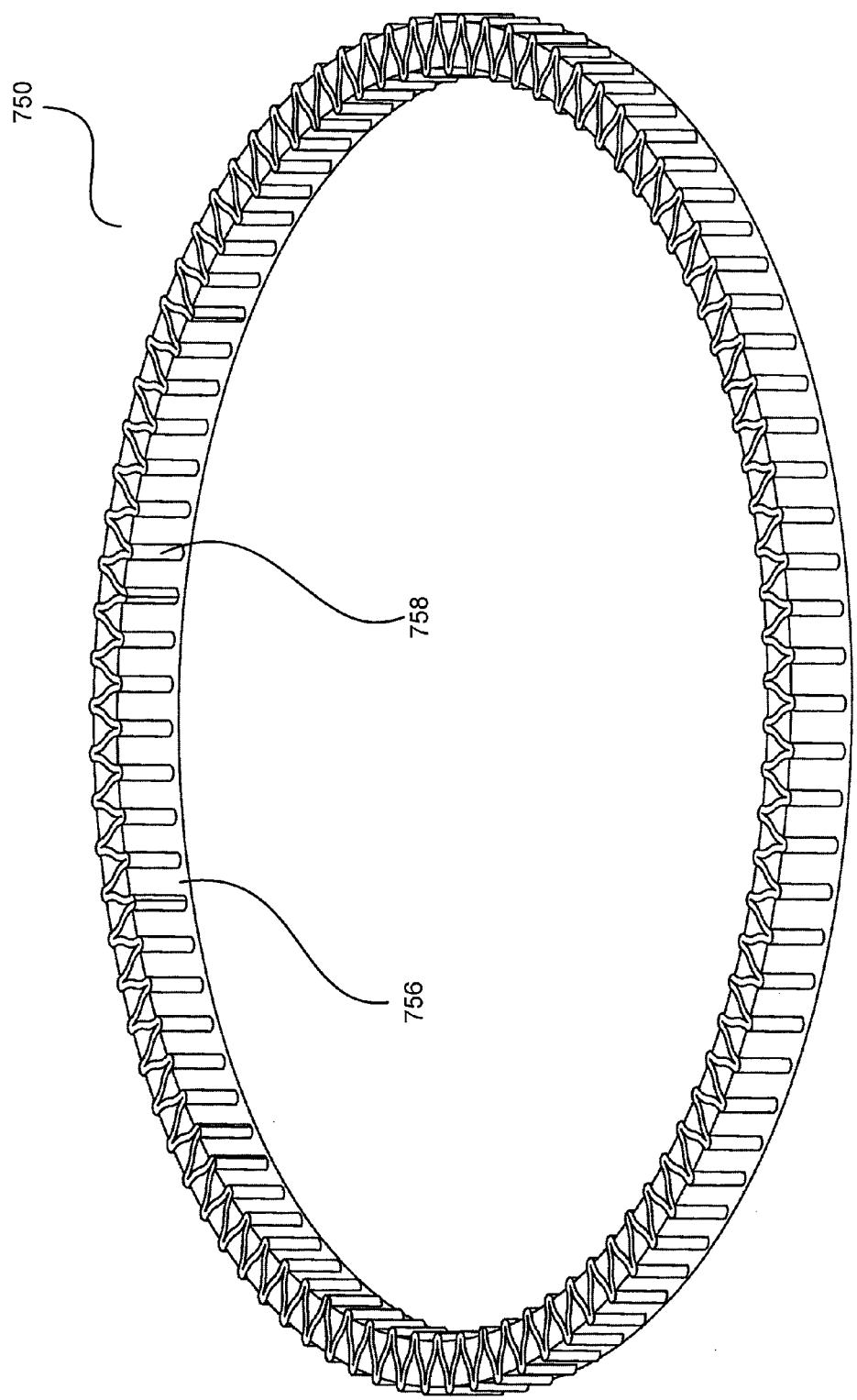
FIG. 7E illustrates flux switch material coupled to a folded rotor frame in accordance with an exemplary embodiment.
Figure 7F:
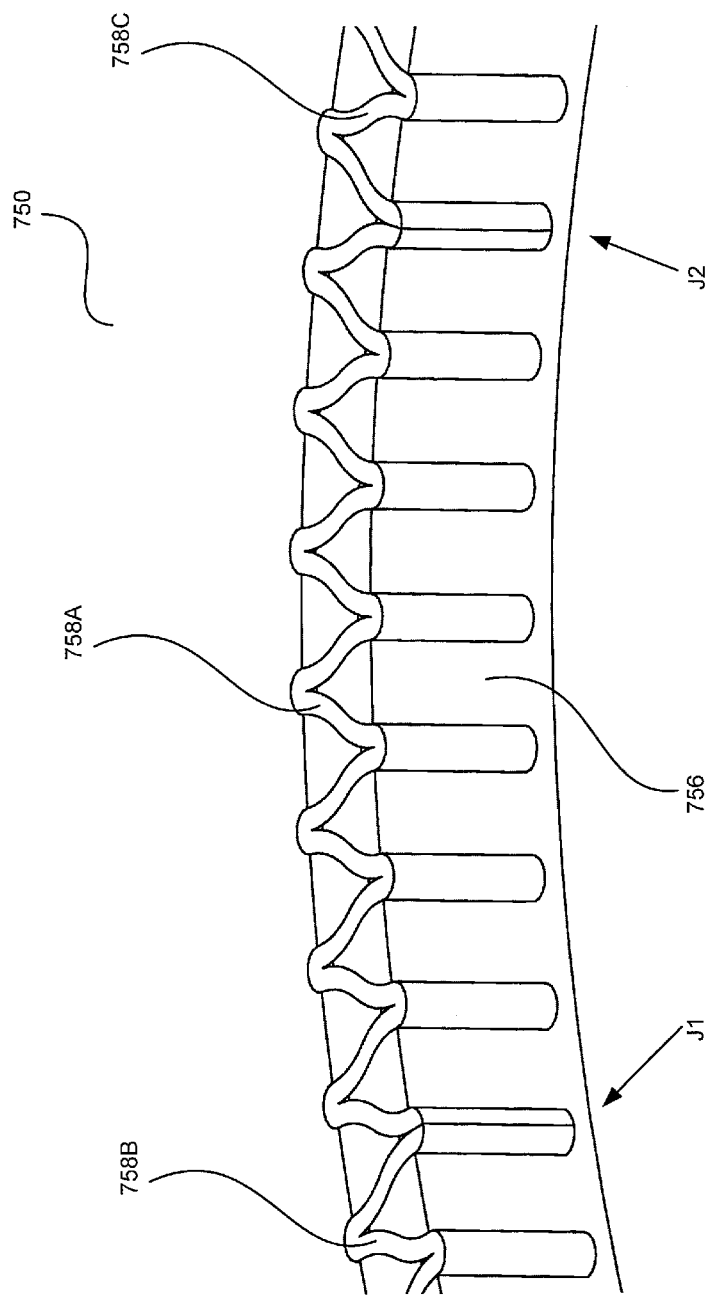
FIG. 7F illustrates a closer view of flux switch material coupled to a folded rotor frame in accordance with an exemplary embodiment.

With reference now to FIGS. 7B and 7C, portions of flux conducting material 758 remaining within rotor body 756 may act as flux switches, for example when coupled to partial stator 710. In various exemplary embodiments, folded rotor 750 may provide a "many to many" flux switching arrangement similar to that of multipath rotor 550. Moreover, folded rotor 750 may also provide a "one to one" flux switching arrangement, as desired.

Additionally, in various exemplary embodiments, folded rotor 750 may have variable spacing between flux switches as discussed above with respect to multipath rotor 550, for example in order to generate variable torque when engaged with a commutated flux machine.

Moreover, various principles applicable to molded rotors and/or folded rotors may be applied to stators and/or other components of transverse and/or commutated flux machines. For example, a stator may be formed via folding a material in order to form a flux switch.

Principles of the present disclosure may suitably be combined with principles for stators in transverse flux machines and commutated flux machines as disclosed in U.S. Ser. No. 12/611,728 filed on Nov. 3, 2009, now U.S. Pat. No. 7,851,965 entitled "TRANSVERSE AND/OR COMMUTATED FLUX SYSTEM STATOR CONCEPTS", the contents of which are hereby incorporated by reference in their entirety.

Principles of the present disclosure may also suitably be combined with principles of polyphase transverse flux machines and polyphase commutated flux machines as disclosed in U.S. Ser. No 12/611,737 filed on Nov. 3, 2009, now U.S. Pat. No. 7,868,508 entitled "POLYPHASE TRANSVERSE AND/OR COMMUTATED FLUX SYSTEMS", the contents of which are hereby incorporated by reference in their entirety.

Moreover, principles of the present disclosure may suitably be combined with any number of principles disclosed in any one of and/or all of the U.S. patent applications incorporated by reference herein. Thus, for example, a particular transverse and/or commutated flux machine may incorporate use of a multipath rotor, use of a partial stator, use of a polyphase design, and/or the like. All such combinations, permutations, and/or other interrelationships are considered to be within the scope of the present disclosure.

While the principles of this disclosure have been shown in various embodiments, many modifications of structure, arrangements, proportions, the elements, materials and components, used in practice, which are particularly adapted for a specific environment and operating requirements may be used without departing from the principles and scope of this disclosure. These and other changes or modifications are intended to be included within the scope of the present disclosure and may be expressed in the following claims.

In the foregoing specification, the invention has been described with reference to various embodiments. However, one of ordinary skill in the art appreciates that various modifications and changes can be made without departing from the scope of the present disclosure. Accordingly, the specification is to be regarded in an illustrative rather than a restrictive sense, and all such modifications are intended to be included within the scope of the present disclosure. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Also, as used herein, the terms "coupled," "coupling," or any other variation thereof, are intended to cover a physical connection, an electrical connection, a magnetic connection, an optical connection, a communicative connection, a functional connection, and/or any other connection. When language similar to "at least one of A, B, or C" is used in the claims, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

Statements of Invention:

An electrical machine, comprising a multipath rotor comprising a first set of elbows on a first side of the rotor and a second set of elbows on a second side of the rotor, wherein the first set of elbows are positioned on the rotor to align with at least one of a first set of flux concentrating stator portions having a first polarity, wherein the second set of elbows are positioned on the rotor to align with at least one of a second set of flux concentrating stator portions having a second polarity different from the first polarity, wherein the electrical machine is at least one of a transverse flux machine or a commutated flux machine. The rotor may provide a flux path from one of the first set of flux concentrating stator portions to each of the second set of flux concentrating stator portions. The rotor may comprise material with a bulk saturation induction in excess of 1.0 Tesla. The rotor may comprise material with a bulk permeability in excess of 1,000μ. The rotor may comprise alternating layers of a first material and a second material. The first material and the second material may be different. The first material may be selected to improve machineability of the multipath rotor. The first material may be silicon steel and the second material may be nanocrystalline composite. The rotor may have a bulk permeability in excess of 1,000μ. The rotor may have a bulk saturation induction in excess of 1.0 Tesla. The rotor may be monolithic. The rotor may direct airflow across a portion of a stator. The rotor may be cavity engaged with a stator. The rotor may be face engaged with a stator. The electrical machine may be an axial gap machine. The electrical machine may be a radial gap machine. The rotor may comprise a stamped planar material that is coiled to form a portion of the rotor. The electrical machine may be passively cooled.

An electrical machine, comprising a multipath rotor comprising a first set of elbows on a first side of the rotor and a second set of elbows on a second side of the rotor, wherein the multipath rotor comprises a material having a bulk permeability in excess of 1,000μ, and wherein the electrical machine is at least one of a transverse flux machine or a commutated flux machine. The multipath rotor may have a bulk saturation induction in excess of 1.0 Tesla.

A method of making a multipath rotor for an electrical machine, the method comprising cutting a planar material to form a strip of planar material comprising a first set of elbows on a first side of the planar material and a second set of elbows on a second side of the planar material, wherein adjacent elbows in the strip of planar material are oriented in opposite directions; aligning a plurality of strips of planar material such that the elbows on the plurality of strips of planar material are in alignment; and bonding the plurality of strips of planar material to form a multipath rotor having a first set of flux switches on the first set of elbows and a second set of flux switches on the second set of elbows, wherein the electrical machine is at least one of a transverse flux machine or a commutated flux machine. Each cut strip of planar material may be patterned similarly to the other cut strips of planar material in the multipath rotor, and the cut strips may be layered parallel to the rotational plane of the multipath rotor. A cut strip may be wound about a mandrel, and each successive cut strip may be wound about the last. The cut strips may be wrapped as successively larger diameter cylinders. A cut strip may be wound about a mandrel to form multiple layers. The multipath rotor may comprise a plurality of layers of planar material configured to conduct magnetic flux substantially within the layer. The multipath rotor may have a bulk permeability in excess of 1,000µ. The multipath rotor may have a bulk saturation induction in excess of 1.0 Tesla. The multipath rotor may be coupled to a stator in a commutated flux machine. The planar material may comprise at least one of: silicon steel, amorphous metal, or nanocrystalline composite. One of the plurality of layers may comprise a first material, and another of the plurality of layers may comprise a second material different from the first material.

A method of making a rotor for an electrical machine, the method comprising forming a rotor frame, wherein the rotor frame comprises a first material having a permeability less than 2µ; and coupling a flux switch to the rotor frame to form a rotor for the electrical machine, wherein the flux switch comprises a second material having a saturation induction in excess of 1.0 Tesla, and wherein a first surface of the flux switch aligns with a first pole of the electrical machine and a second surface of the flux switch aligns with a second pole of the electrical machine in order to conduct magnetic flux. A recess may be formed in the rotor frame to accept the flux switch. The rotor frame may comprise a recess configured to accept the flux switch, and the recess may be configured to align the flux switch at an angle with respect to the rotational plane of the rotor. The angle may be selected as a function of a width of an air gap of the electrical machine and a distance between poles in the electrical machine. The angle may be between 5 degrees and 70 degrees. The flux switch may be molded within the recess.

An electrical machine, comprising: a mechanically formed rotor, the rotor comprising a plurality of flux switches each having a first surface and a second surface, wherein the first surface of one of the plurality of flux switches aligns with a first stator pole of the electrical machine and the second surface of the same one of the plurality of flux switches aligns with a second stator pole of the electrical machine, and wherein the electrical machine is at least one of a transverse flux machine or a commutated flux machine. The mechanically formed rotor may be a multipath rotor. The flux switches may comprise material with a bulk saturation induction in excess of 1.0 Tesla. The flux switches may comprise material with a bulk permeability in excess of 1,000µ. The alignment of the first and second surfaces may be configured to cause each flux switch of the plurality of flux switches to close a magnetic circuit in the electrical machine. The rotor may be formed via at least one of: sintering, CNC machining, tape winding, laser cutting, stamping, die cutting, or water jet cutting. The flux switches may be angled with respect to the rotational plane of the rotor. A geometric configuration of each of the plurality of flux switches may be configured to cause each of the plurality of flux switches to close a magnetic circuit in the electrical machine. The geometric configuration may be a function of at least one of a switch angle, an engagement depth, a switch height, a switch thickness, a switch area, a concentrator thickness, or a magnet thickness. The flux switch angle may be between about 5 degrees and about 70 degrees with respect to the rotational plane of the rotor. The rotor may be mechanically formed from a planar material substantially as wide as an air gap of the electrical machine.

The flux switch angle may be a function of a width of an air gap of the electrical machine and an on-center distance between poles in the electrical machine. The plurality of flux switches may be angled at about 90 degrees with respect to the rotational plane of the rotor, and a flux concentrating stator portion of the electrical machine may be non-planar. The rotor may comprise at least one of: silicon steel, amorphous metal, powdered metal, plated powdered metal, or nanocrystalline composite. The rotor may be configured to support a switching frequency in the electrical machine in excess of 1000 Hz.

An electrical machine, comprising: a rotor comprising a molded rotor frame and a flux switch, wherein the molded rotor frame comprises a first material having a permeability less than 2µ, wherein the flux switch comprises a second material having a saturation induction in excess of 1.0 Tesla, wherein the flux switch is coupled to the molded rotor frame, wherein a first surface of the flux switch aligns with a first pole of the electrical machine, wherein a second surface of the flux switch aligns with a second pole of the electrical machine in order to conduct magnetic flux, and wherein the electrical machine is at least one of a transverse flux machine or a commutated flux machine. The molded rotor may provide a flux path from one of a first set of flux concentrating stator portions to each of the second set of flux concentrating stator portions. The molded rotor may be cavity engaged with a stator. The molded rotor may be face engaged with a stator. The electrical machine may be an axial gap electrical machine. The electrical machine may be a radial gap electrical machine. The first material may comprise a polymer. The second material may be at least one of amorphous metal, silicon steel, or nanocrystalline composite. The flux switch may be set flush to a surface of the molded rotor frame. A portion of the flux switch may extend outwardly beyond a surface of the molded rotor frame.

A multipath rotor for an electrical machine, wherein the rotor comprises: a first set of elbows on a first side of the multipath rotor; a second set of elbows on a second side of the multipath rotor opposite the first side; wherein the multipath rotor comprises a generally annular shape; wherein the multipath rotor is configured to serve as a flux switch in the electrical machine by transferring flux from one or more of the first set of elbows to one or more of the second set of elbows, and wherein the electrical machine is at least one of a transverse flux machine or a commutated flux machine.

What is claimed is:
1. An electrical machine, comprising:
a rotor comprising a rotor frame and a flux switch,
wherein the rotor frame comprises a first material,
wherein the flux switch comprises a second material having a saturation induction in excess of 1.0 Tesla,
wherein the flux switch is coupled to the rotor frame,
wherein a first surface of the flux switch aligns with a first pole of the electrical machine,
wherein a second surface of the flux switch aligns with a second pole of the electrical machine in order to conduct magnetic flux, and
wherein the electrical machine is at least one of a transverse flux machine or a commutated flux machine.
2. The electrical machine of claim 1, wherein the first material has a permeability less than 2µ.
3. The electrical machine of claim 1, wherein the first material has a permeability less than 5µ.
4. The electrical machine of claim 1, wherein the rotor frame comprises material configured to reduce flux leakage from the flux switch.

5. The electrical machine of claim 1, wherein the rotor provides a flux path from each one of a first set of flux concentrating stator portions having a first polarity to each one of a second set of flux concentrating stator portions having an opposite polarity.

6. The electrical machine of claim 1, further comprising a plurality of stators operatively coupled to the rotor.

7. The electrical machine of claim 1, wherein the rotor is coupled to at least one of: an automobile wheel, a bicycle wheel, a scooter wheel, a propeller, a machine tool, or a drum of a washing machine.

8. The electrical machine of claim 1, wherein the engagement depth of the rotor with a stator is variable in order to vary at least one of: a voltage constant of the electrical machine, a torque constant of the electrical machine, an efficiency level of the electrical machine, or an RPM of the electrical machine.

9. The electrical machine of claim 1, wherein the electrical machine has a continuous, thermally stable torque density in excess of 20 Newton-meters per kilogram.

10. The electrical machine of claim 1, wherein the electrical machine has a continuous, thermally stable torque density in excess of 50 Newton-meters per kilogram.

11. The electrical machine of claim 9, wherein the electrical machine has a diameter less than 14 inches.

12. The electrical machine of claim 1, wherein the rotor comprises a plurality of flux switches, and wherein the plurality of flux switches are not evenly distributed about the rotor.

13. The electrical machine of claim 1, wherein the rotor is configured to support a magnetic flux switching frequency in the electrical machine in excess of 1000 Hz.

14. The electrical machine of claim 1, wherein the second material is at least one of amorphous metal or silicon steel.

15. The electrical machine of claim 1, wherein a surface of the flux switch is flush to a surface of the rotor frame.

16. The electrical machine of claim 1, wherein a portion of the flux switch extends outwardly beyond a surface of the rotor frame.

17. The electrical machine of claim 1, wherein the flux switch is angled with respect to the rotational plane of the rotor.

18. A method of forming a rotor for an electrical machine, the method comprising:
   forming a rotor frame having a plurality of trenches therein;
   placing a continuous section of material within at least two of the plurality of trenches, such that the continuous section of material has at least one bend; and
   removing at least a portion of the material to form a flux switch,
   wherein the electrical machine is at least one of a transverse flux machine or a commutated flux machine.

19. The method of claim 18, wherein the rotor is a multi-path rotor.

20. The method of claim 18, wherein the material comprises layered planar material.

21. The method of claim 18, wherein the material comprises amorphous metal.

22. A rotor for an electrical machine, the rotor comprising:
   a rotor frame having a plurality of trenches therein; and
   a first flux switch and a second flux switch, wherein the first flux switch and the second flux switch are disposed in adjacent trenches of the rotor frame,
   wherein the first flux switch and the second flux switch were formed from a continuous section of material having at least one bend therein, and
   wherein the electrical machine is at least one of a transverse flux machine or a commutated flux machine.

23. The electrical machine of claim 22, wherein the continuous section of material is amorphous metal.

* * * * *